US012133175B2

(12) United States Patent
Huang et al.

(10) Patent No.: US 12,133,175 B2
(45) Date of Patent: Oct. 29, 2024

(54) POWER CONTROL FOR PHYSICAL UPLINK CONTROL CHANNEL (PUCCH) TRANSMISSIONS ON SECONDARY COMPONENT CARRIER

(71) Applicant: QUALCOMM Incorporated, San Diego, CA (US)

(72) Inventors: Yi Huang, San Diego, CA (US); Peter Gaal, San Diego, CA (US); Xiao Feng Wang, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/497,676

(22) Filed: Oct. 30, 2023

(65) Prior Publication Data

US 2024/0064651 A1 Feb. 22, 2024

Related U.S. Application Data

(62) Division of application No. 17/410,987, filed on Aug. 24, 2021.

(60) Provisional application No. 63/083,075, filed on Sep. 24, 2020.

(51) Int. Cl.
*H04W 52/14* (2009.01)
*H04L 1/1867* (2023.01)
(Continued)

(52) U.S. Cl.
CPC ......... *H04W 52/146* (2013.01); *H04L 1/1896* (2013.01); *H04W 52/08* (2013.01); *H04W 52/10* (2013.01); *H04W 52/367* (2013.01)

(58) Field of Classification Search
CPC ... H04W 52/146; H04W 52/08; H04W 52/10; H04W 52/367; H04L 1/1896; H04L 1/1692
See application file for complete search history.

(56) References Cited

U.S. PATENT DOCUMENTS

2011/0081927 A1 4/2011 Gerstenberger et al.
2013/0100842 A1* 4/2013 Nishikawa ............. H04L 5/001
370/252
(Continued)

FOREIGN PATENT DOCUMENTS

EP 2741549 A1 6/2014

OTHER PUBLICATIONS

"3 Generation Partnership Project, Technical Specification Group Radio Access Network, Evolved Universal Terrestrial Radio Access (E-UTRA), Physical Layer Procedures (Release 16)", 3GPP Standard, Technical Specification, 3GPP TS 36.213, 3rd Generation Partnership Project (3GPP), Mobile Competence Centre, 650, Route Des Lucioles, F-06921 Sophia-Antipolis Cedex, France, vol. RAN WG1, No. V16.2.0, Jul. 14, 2020, XP051925040, pp. 8-60, Paragraph 5 .1. 2.
(Continued)

*Primary Examiner* — Christine Ng
(74) *Attorney, Agent, or Firm* — QUALCOMM Incorporated

(57) ABSTRACT

Aspects relate to supporting power control for physical uplink control channel (PUCCH) transmissions on an uplink secondary component carrier (SCC) of a wireless communication system. In some aspects, a user equipment (UE) receives a power control configuration from a base station for use by the UE for a PUCCH transmission on a selected uplink SCC. The UE then transmits, based at least in part on the power control configuration, the PUCCH to the base station on the selected uplink SCC. Closed-loop and open-
(Continued)

loop power control examples are provided. In some aspects, common or shared power control configurations are provided by the base station for use with each component carrier of a PUCCH group. In other aspects, carrier-specific power control configurations are provided by the base station.

23 Claims, 22 Drawing Sheets

(51) Int. Cl.
 *H04W 52/08* (2009.01)
 *H04W 52/10* (2009.01)
 *H04W 52/36* (2009.01)

(56) References Cited

U.S. PATENT DOCUMENTS

| | | | |
|---|---|---|---|
| 2014/0023028 A1* | 1/2014 | Zhang | H04W 52/325 370/329 |
| 2015/0124727 A1* | 5/2015 | Yan | H04L 5/0046 370/329 |
| 2015/0230206 A1 | 8/2015 | Tabet et al. | |
| 2015/0245344 A1* | 8/2015 | You | H04L 1/1861 370/280 |
| 2015/0249980 A1* | 9/2015 | You | H04W 72/21 370/329 |
| 2016/0135147 A1 | 5/2016 | Ouchi et al. | |
| 2016/0286504 A1* | 9/2016 | He | H04W 52/08 |
| 2019/0191328 A1 | 6/2019 | Dinan | |
| 2021/0289445 A1* | 9/2021 | Muruganathan | H04W 52/146 |
| 2021/0344440 A1* | 11/2021 | Yoshioka | H04L 1/008 |
| 2022/0057215 A1* | 2/2022 | Ananth | G06Q 10/08 |
| 2022/0095238 A1 | 3/2022 | Huang et al. | |
| 2022/0303911 A1* | 9/2022 | Medina Acosta | H04W 52/48 |
| 2023/0156485 A1 | 5/2023 | Zhang et al. | |

OTHER PUBLICATIONS

International Search Report and Written Opinion—PCT/US2021/047589—ISA/EPO—Dec. 13, 2021.

* cited by examiner

2100

2102 — Transmit, from a base station to a user equipment (UE), one or more indicators of power control configurations for use by the UE for a physical uplink control channel (PUCCH) transmission on a secondary component carrier of a set of uplink component carriers that includes a primary component carrier and the secondary component carrier, wherein the indicators are configured to indicate (a) open-loop power control configuration, (b) carrier-specific open-loop target receive power values for use with each of the set of uplink component carriers, and (c) separate power loop control parameters for enhanced Mobile Broadband (eMBB) transmissions and for Ultra Reliable Low Latency Communication (URLLC) transmissions 2104 — Receive, based at least in part on the power control configurations, PUCCH transmissions from the UE on the SCC while employing open-loop power control and with separate power control loops for use with eMBB and URLLC

FIG. 21

POWER CONTROL FOR PHYSICAL UPLINK CONTROL CHANNEL (PUCCH) TRANSMISSIONS ON SECONDARY COMPONENT CARRIER

CROSS-REFERENCE TO RELATED APPLICATIONS

The present application for patent is a Divisional of, and claims priority to, pending U.S. patent application Ser. No. 17/410,987, titled "POWER CONTROL FOR PHYSICAL UPLINK CONTROL CHANNEL (PUCCH) TRANSMISSIONS ON SECONDARY COMPONENT CARRIER," filed Aug. 24, 2021, which claimed priority to Provisional Application Ser. No. 63/083,075, titled "POWER CONTROL FOR PHYSICAL UPLINK CONTROL CHANNEL (PUCCH) TRANSMISSIONS ON SECONDARY COMPONENT CARRIER," filed Sep. 24, 2020, both of which are assigned to the assignee hereof and hereby expressly incorporated by reference herein as if fully set forth below and for all applicable purposes.

FIELD OF THE DISCLOSURE

The technology discussed herein relates generally to wireless communication systems, and more particularly, to power control for physical uplink control channels.

DESCRIPTION OF RELATED ART

Wireless communications systems are widely deployed to provide various types of communication content such as voice, video, packet data, messaging, broadcast, and so on. The systems may be capable of supporting communication with multiple users by sharing the available system resources (e.g., time, frequency, and power). Examples of multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. The systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems provide for carrier aggregation to allow a UE to communicate with a base station using a primary component carrier and multiple secondary component carriers. There is an on-going need for improvements in power control during uplink transmissions, particularly for use with carrier aggregation.

SUMMARY

The following presents a summary of one or more aspects of the present disclosure, in order to provide a basic understanding of such aspects. This summary is not an extensive overview of all contemplated features of the disclosure, and is not intended to either identify key or critical elements of any or all aspects of the disclosure or delineate the scope of any or all aspects of the disclosure. Its purpose is to present some concepts of one or more aspects of the disclosure in a form as a prelude to the more detailed description that is presented later.

In one aspect, a user equipment (UE) is provided that includes: a transceiver; a memory; and a processor communicatively coupled to the transceiver and the memory. The processor is configured to: receive, from a base station, an indicator of an open-loop power control configuration for use by the UE for a physical uplink control channel (PUCCH) transmission on a secondary component carrier of a set of uplink component carriers that comprises a primary component carrier and the secondary component carrier, wherein the indicator is configured to indicate carrier-specific open loop target receive power values for the primary component carrier and for the secondary component carrier, and wherein the indicator is further configured to indicate carrier-specific spatial relationship information, the spatial relationship information comprising a closed-loop index; and transmit, based at least in part on the power control configuration, the PUCCH transmission to the base station on the secondary component carrier.

In another aspect, a method is provided for wireless communication for use by a UE in a communication network. The method includes: receiving, from a base station, an indicator of an open-loop power control configuration for use by the UE for a PUCCH transmission on a secondary component carrier of a set of uplink component carriers that comprises a primary component carrier and the secondary component carrier, wherein the indicator is configured to indicate carrier-specific open loop target receive power values for the primary component carrier and for the secondary component carrier, and wherein the indicator is further configured to indicate carrier-specific spatial relationship information, the spatial relationship information comprising a closed-loop index; and transmitting, based at least in part on the power control configuration, the PUCCH transmission to the base station on the secondary component carrier.

In another aspect, a base station is provided that includes: a transceiver; a memory; and a processor communicatively coupled to the transceiver and the memory. The processor is configured to: transmit, to a UE, an indicator of an open-loop power control configuration for use by the UE for a PUCCH transmission on a secondary component carrier of a set of uplink component carriers that comprises a primary component carrier and the secondary component carrier, wherein the indicator is configured to indicate carrier-specific open loop target receive power values for the primary component carrier and for the secondary component carrier, and wherein the indicator is further configured to indicate carrier-specific spatial relationship information, the spatial relationship information comprising a closed-loop index and receive, based at least in part on the power control configuration, the PUCCH transmission from the UE on the secondary component carrier.

In yet another aspect, a method is provided for wireless communication for use by a base station in a communication network. The method includes: transmitting, to a UE, an indicator of an open-loop power control configuration for use by the UE for a physical uplink control channel (PUCCH) transmission on a secondary component carrier of a set of uplink component carriers that comprises a primary component carrier and the secondary component carrier, wherein the indicator is configured to indicate carrier-specific open loop target receive power values for the primary component carrier and for the secondary component carrier, and wherein the indicator is further configured to indicate carrier-specific spatial relationship information, the spatial relationship information comprising a closed-loop index; and receiving, based at least in part on the power control configuration, the PUCCH transmission from the UE on the secondary component carrier.

These and other aspects of the disclosure will become more fully understood upon a review of the detailed description, which follows. Other aspects, features, and embodiments of the present disclosure will become apparent to those of ordinary skill in the art, upon reviewing the following description of specific, exemplary embodiments in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 21 is a flow chart illustrating further aspects of an exemplary process for use by a base station (or other scheduling entity) for open-loop power control according to some aspects.

DETAILED DESCRIPTION

Figure 1:
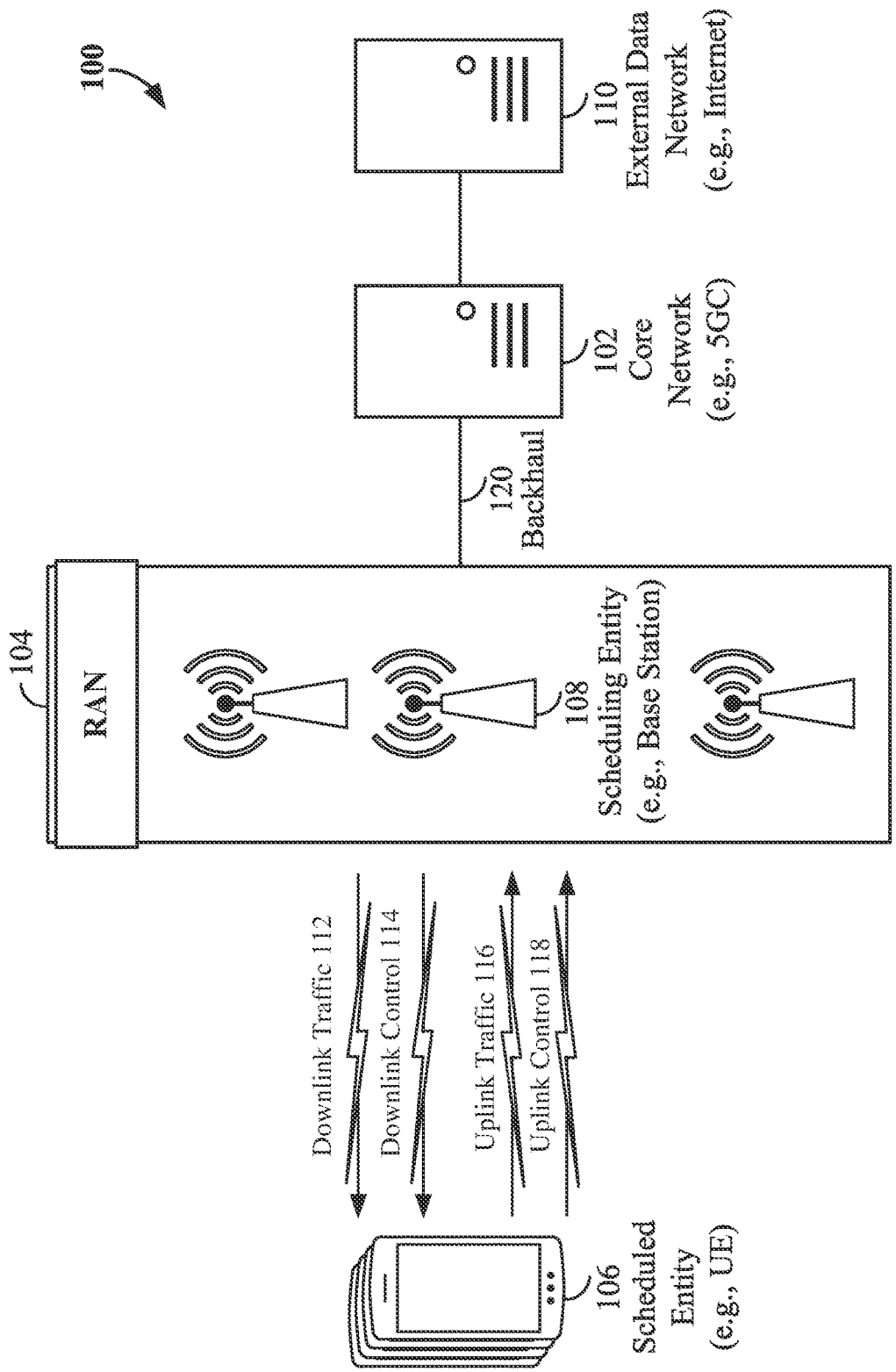
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

A user equipment (UE) may be configured for multi-carrier communications using one or more cells associated with one or more primary carriers (e.g., a primary component carrier (PCC)) and one or more secondary carriers (e.g., secondary component carrier(s) (SCCs)). The cells may include, in some examples, a physical uplink control channel (PUCCH) group associated with the UE for multi-carrier communications. One cell may be designated as a primary cell (PCell) whereas one or more other cells may be designated as a secondary cell (SCell). The PCell may be associated with a PCC (e.g., the primary carrier) and each SCell may be associated with one or more SCC(s) (e.g., the secondary carrier(s)). Note, however, that primary and secondary component carriers may be used by a UE to transmit data to a single base station. Hence, the secondary SCCs are not necessarily associated with separate base stations. Rather, a single base station may serve as both the PCell and SCells for uplink transmissions from a UE, with the base station including separate radio frequency RF receive chains for separately receiving and processing transmissions from the UE on the PCC and the SCCs.

Moreover, some carriers may be configured for time division duplexing (TDD) where each transmission opportunity (e.g., each symbol, mini slot, slot, etc.) is designated as either a downlink transmission opportunity, an uplink transmission opportunity, or a flexible transmission opportunity (e.g., a slot may be used for uplink or downlink communications and may include a switching gap for the UE to retune from downlink transmissions to uplink transmissions or vice versa and the like). Some carriers may be configured for frequency division duplexing (FDD) where a transmission opportunity may be used for both uplink or downlink communications. In some wireless communications systems, the UE may be limited to transmitting uplink control information within, for example, a physical uplink control channel (PUCCH) on the primary carrier. When the primary carrier is a TDD carrier (among other scenarios), however, this may result in a large delay for the PUCCH transmission due to the uplink/downlink/flexible slot configuration or pattern (e.g., an uplink transmissions may not be allowed in a TDD slot configured with all downlink symbols).

Accordingly, aspects of the techniques described herein address the aforementioned issues and other issues by providing mechanisms wherein the UE can transmit uplink control information within, for example, a PUCCH, on a secondary carrier or on both a primary carrier and a secondary carrier. For example, techniques are described that support power control of PUCCH transmissions on an SCC.

In some aspects, a UE receives from a base station an indicator of a power control configuration for use by the UE for a PUCCH transmission on a selected SCC of a set of uplink aggregated component carriers, where the set of uplink component carriers includes a PCC and one or more SCCs. The indicator may be, for example, parameters provided within downlink control information (DCI) for closed-loop power control and radio resource control (RRC) signaling for open-loop power control. The UE then transmits, based at least in part on the power control configuration, the PUCCH to the base station on the SCC. Note that in the aforementioned examples, the aggregated component carriers are uplink component carriers. Note also that in many of the examples described herein, the uplink transmissions from the UE are sent to a single base station that serves as both the PCell and the SCells for the PCC and SCC uplink transmissions. At least some aspects described herein are also applicable to PCC/SCC uplink transmission to separate base stations, where one base station serves as the PCell for uplink PCC transmissions from the UE and a separate base station serves as the SCell for uplink SCC transmissions from the UE.

In some aspects, the indicator is configured to indicate or specify an open-loop power control configuration, such as by providing a common (or shared) open-loop target receive power value ($P_O$) for the PCC and the SCC for the PUCCH. For example, the indicator may indicate the common open-loop target receive power value ($P_O$) by indicating common or shared values for a nominal PUCCH power value ($P_{O\_nominal\_PUCCH}$) and a power set value (p0-Set). That is, the same $P_{O\_nominal\_PUCCH}$ and p0-Set values may be used by the UE for PCC PUCCH transmissions and for SCC PUCCH transmissions.

In other aspects, the indicator may indicate carrier-specific open-loop target receive power values ($P_O$) for the PCC and the SCC. For example, the indicator may indicate the carrier-specific open-loop target receive power values ($P_O$) by indicating separate values for $P_{O\_nominal\_PUCCH}$ and p0-Set for each component carrier. That is, different $P_{O\_nominal\_PUCCH}$ and p0-Set values may be used by the UE for PCC PUCCH transmissions and for different SCC PUCCH transmissions on different SCCs. In some examples, sixteen uplink SCCs are provided along with the uplink PCC within the wireless communication system.

In other aspects, the indicator is configured to indicate or specify a closed-loop power control command or configuration, such as by specifying carrier-specific accumulative closed-loop power control in which power control (PC) values are accumulated separately for the PCC and for the SCCs. In other examples, the indicator is configured to indicate or specify a carrier-specific absolute power control in which PC values are not accumulated either for the PCC or for the SCCs. In this manner, issues related to the handling of PC values obtained from PCC vs. SCC are addressed.

For wireless communication systems that support both enhanced Mobile Broadband (eMBB) transmissions Ultra Reliable Low Latency Communication (URLLC) transmissions, separate power control configuration indicators may be provided for eMBB and URLLC to allow for separate power control, with one configured, for example, for open-loop power control and the other configured for closed-loop power control. In this manner, issues related to the handling of eMBB vs. URLLC are addressed.

Before discussing the and other techniques in detail, an overview of a wireless communication system is provided. However, it is noted that the various concepts presented throughout this disclosure may be implemented across a broad variety of telecommunication systems, network architectures, and communication standards.

Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services. Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106 (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities 106 (e.g., one or more UEs 106) to the scheduling entity 108. On the other hand, the scheduled entity 106 (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
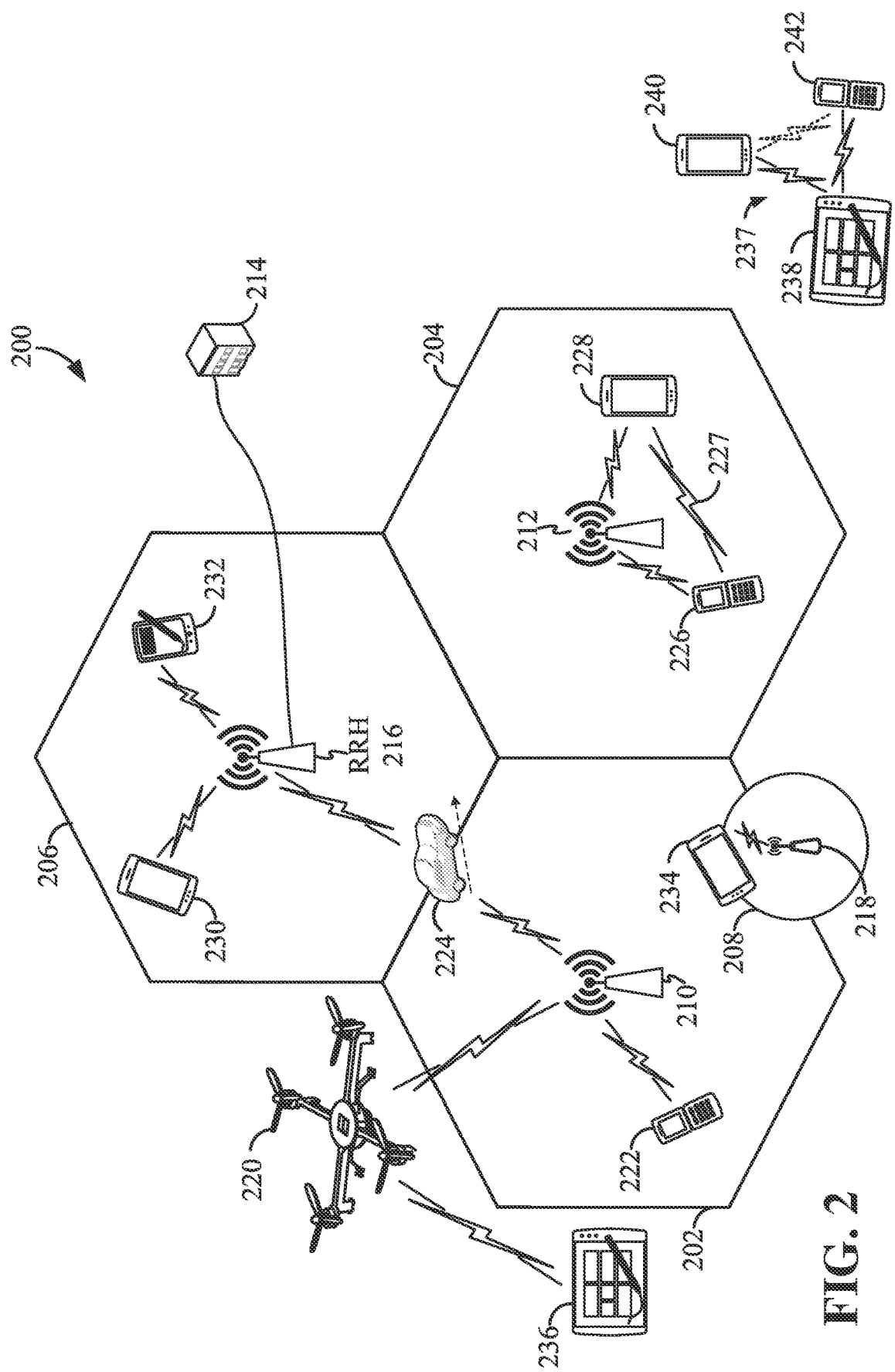
FIG. 2 is an illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, and 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the RAN are generally set up, maintained, and released under the control of an access and mobility management function (AMF, not illustrated, part of the core network 102 in FIG. 1). In some scenarios, the AMF may include a security context management function (SCMF) and a security anchor function (SEAF) that performs authentication. The SCMF can manage, in whole or in part, the security context for both the control plane and the user plane functionality In some examples the RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of the parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In order for transmissions over the RAN 200 to obtain a low block error rate (BLER) while still achieving very high data rates, channel coding may be used. That is, wireless communication may generally utilize a suitable error correcting block code. In a typical block code, an information message or sequence is split up into encoded code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using polar coding, based on nested sequences. For at least some of the channels, puncturing, shortening, and repetition are used for rate-matching.

However, those of ordinary skill in the art will understand that aspects of the present disclosure may be implemented utilizing any suitable channel code. Various implementations of scheduling entities and scheduled entities may include suitable hardware and capabilities (e.g., an encoder, a decoder, and/or a CODEC) to utilize one or more of the channel codes for wireless communication.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, where technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
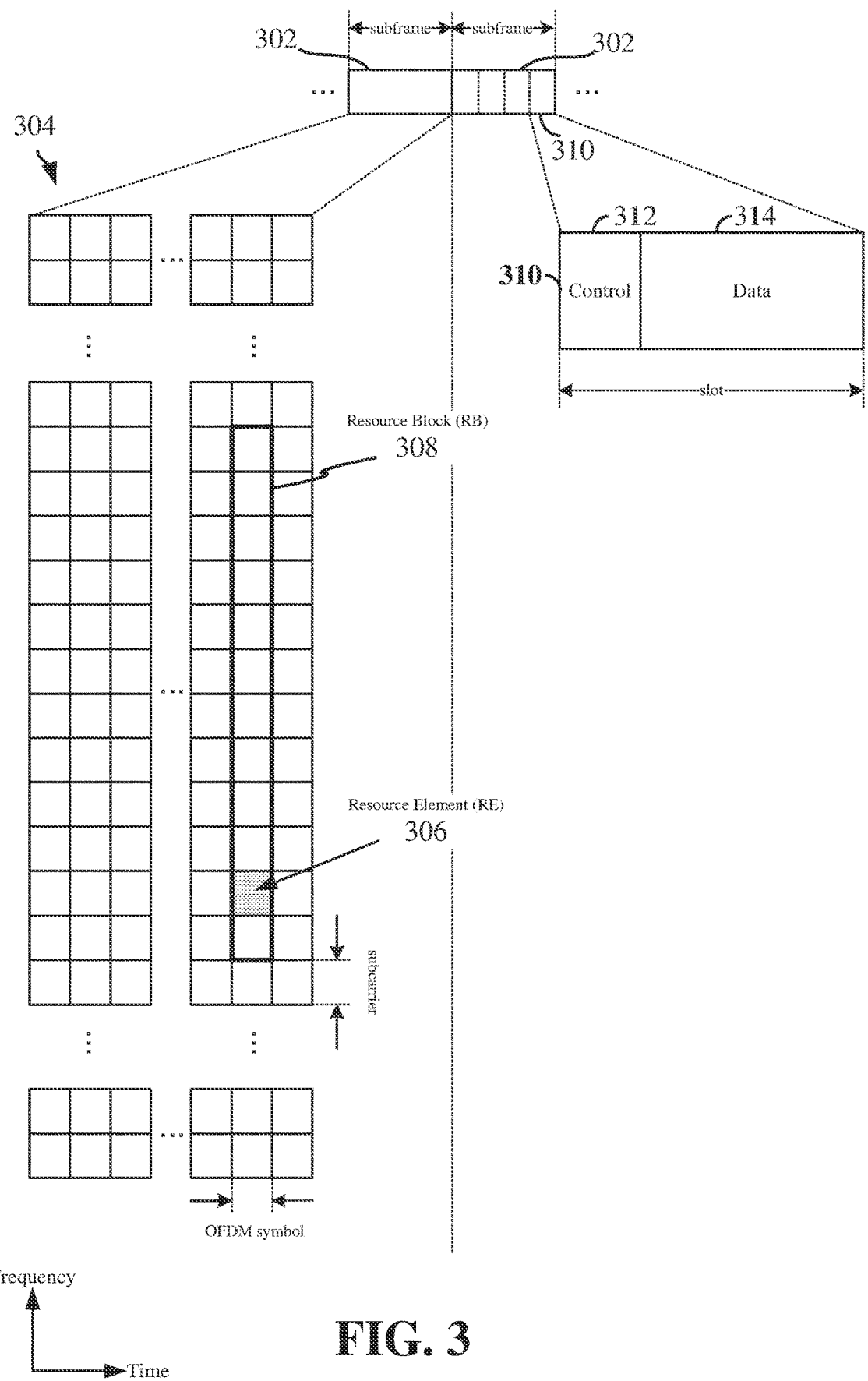
FIG. 3 is a diagram illustrating an example of a frame structure for use in a radio access network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). The mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. The pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open-loop power control parameters and/or one or more closed-loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSB s may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIB s and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
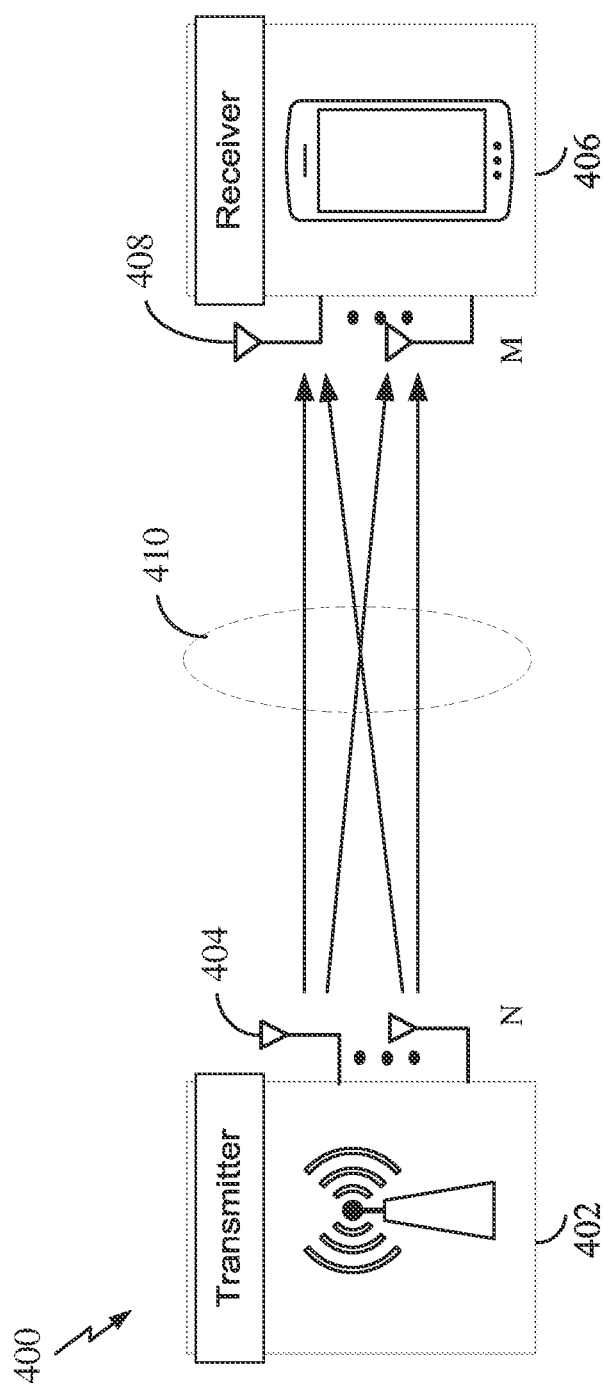
FIG. 4 is a block diagram illustrating a wireless communication system supporting multiple-input multiple-output (MIMO) and beamforming communication according to some aspects.

In some aspects, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback channel state information (CSI). The CSI may include, for example, a channel quality indicator (CQI) that indicates to the base station a modulation and coding scheme (MCS) to use for transmissions to the UE, the RI that indicates to the base station the number of layers to use for transmissions to the UE, a precoding matrix indicator (PMI) that indicates to the base station the precoding matrix to use for transmissions to the UE, and other suitable parameters.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

Figure 5:
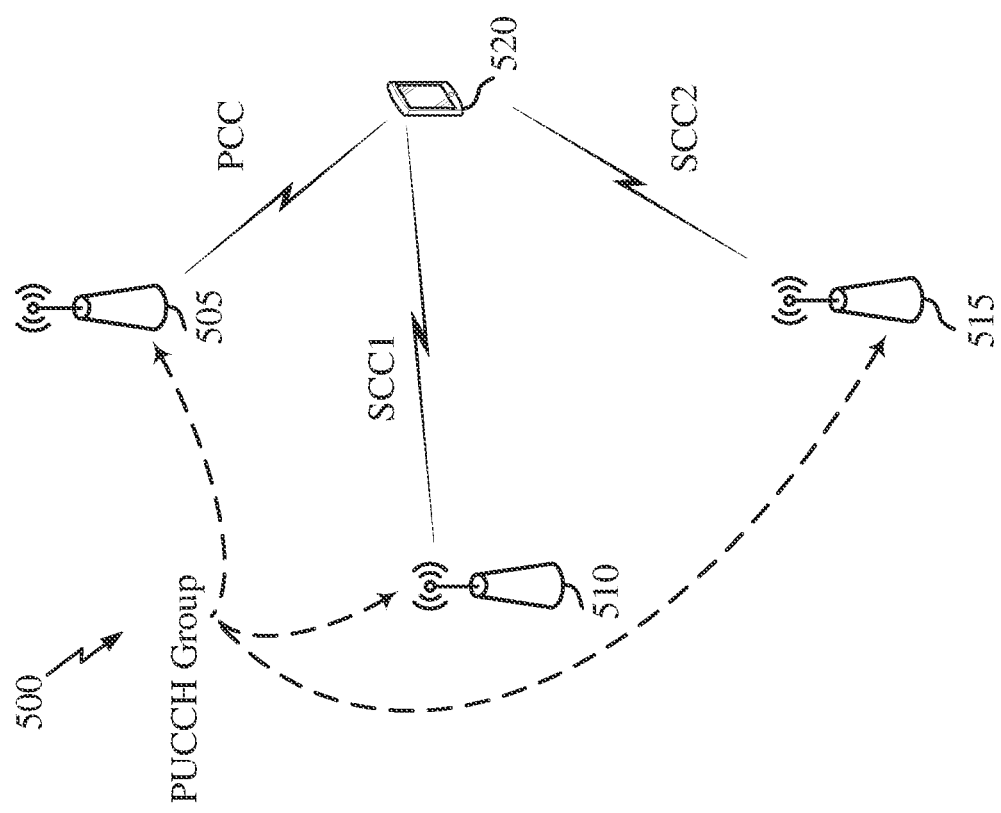
FIG. 5 is a diagram illustrating an example of a wireless communications system that supports uplink primary and second component carriers to separate base stations in accordance with aspects.

FIG. 5 illustrates an example of a wireless communications system 500 that supports primary and secondary component carriers. In some examples, the wireless communications system 500 may implement aspects of wireless communications systems of FIGS. 1-4. The wireless communications system 500 may include base station 505, base station 510, base station 515, and/or UE 520, which may be examples of corresponding devices described herein. In some aspects, the base station 505, base station 510, base station 515 may constitute or otherwise form a PUCCH group for UE 520 to support multi-carrier communications using at least a primary carrier and one or more secondary carriers.

The UE 520 may be configured for multi-carrier communication using one or more cells associated with at least a primary carrier (e.g., a PCC) and secondary carrier(s) (e.g., SCC)(s). The cells may constitute a PUCCH group associated with UE 520 for the multi-carrier communications. In the example illustrated in FIG. 5, base station 505, base station 510, and base station 515 may be considered cells within, and therefore form, the PUCCH group for UE 520. One cell (e.g., base station 505) may be designated as the PCell whereas the other cell(s) (e.g., base station 510, base station 515) may be designated as secondary cell(s). The PCell may be associated with a PCC (e.g., the primary carrier) and each secondary cell may be associated with one or more SCC(s) (e.g., the secondary carrier(s)), e.g., base station 510 may be associated with a first secondary carrier (e.g., SCC1) and base station 515 may be associated with a second or additional secondary carrier (e.g., SCC2).

Moreover, some carriers may be configured for TDD wherein each transmission opportunity (e.g., each symbol, mini slot, slot, etc.) is designated as either a downlink transmission opportunity, an uplink transmission opportunity, or a flexible transmission opportunity (e.g., a slot may be used for uplink or downlink communications, and may include a switching gap for the UE to retune from downlink transmissions to uplink transmissions (or vice versa), and the like). Some carriers may be configured for FDD wherein a transmission opportunity (e.g., a slot) may be used for both uplink and downlink communications simultaneously. In some wireless communications systems, the UE is only permitted to transmit PUCCH information on the primary carrier. However, when the primary carrier is a TDD carrier, this may result in a large delay for the PUCCH transmission due to the uplink/downlink/flexible slot configuration or pattern (e.g., an uplink transmission may not be allowed in a TDD slot configured with all downlink symbols). Accordingly, aspects of the described techniques provide a mechanism wherein the UE 520 is able to transmit a PUCCH on a secondary carrier (e.g., SCC1 and/or SCC2) while performing power control.

For example, UE 520 may receive a downlink transmission (e.g., PDCCH and/or PDSCH) on the primary (e.g., on PCC from base station 505) and/or on secondary carrier(s) (e.g., on SCC1 from base station 510 and/or on SCC2 from base station 515) from cells of the PUCCH group. The UE 520 may identify or otherwise determine feedback information (e.g., ACK/NACK information based on whether UE 520 is able to successfully decode the downlink transmission, a channel measurement report associated with the downlink transmission (e.g., a CSI-RS measurement report), and the like) based on the downlink transmission. The UE 520 may then select the primary carrier (e.g., PCC) and/or the secondary carrier (e.g., SCC1 and/or SCC2) for transmitting the feedback information to the base station (e.g., base station 505 if UE 520 chooses PCC, base station 510 if UE 520 choses SCC1, and so forth). The UE 520 may select the primary carrier and/or the secondary carrier for transmitting a feedback message (e.g., the PUCCH transmission) including the feedback information to the base station (depending on which carrier UE 520 chooses for the PUCCH transmission).

In some aspects, this may include, when using TDD for uplink carrier aggregation (e.g., when all CCs in the PUCCH group are TDD carriers), base station 505 (the PCell in this example) may configure a TDD pattern in a staggering/complementary fashion (e.g., in the time domain) such that there are a maximum number of slots supporting uplink transmissions across all CCs. The base station 505 may transmit or otherwise convey a signal configuring the slot format patterns, e.g., in radio resource control (RRC) signaling, a medium access control element (MAC CE), DCI, and the like, to UE 520. In one non-limiting example, this may include base station 505 configuring the slot format pattern such that there is at least one carrier available for UE 520 to use for an uplink transmission in each slot. For example, UE 520 may receive a signal configuring slot format patterns for the primary and/or secondary carrier(s), wherein the slot format patterns for the different carriers are selected such that instances of uplink slots are staggered to occur more frequently.

In the example illustrated in FIG. 5, as one example among others, it should be understood that various carrier TDD/FDD configurations may be supported. That is, the PCC, SCC1, and/or SCC2 may be TDD carrier(s), FDD carrier(s), or any combination of TDD/FDD carriers. In one example, the PCC may be a TDD carrier and SCC1 and/or SCC2 may be FDD carrier(s). In another example, the PCC may be a FDD carrier and SCC1 and/or SCC2 may be TDD carriers. In another example, the SCC1 may be a TDD carrier and SCC2 may be a FDD carrier, or vice versa. Accordingly, aspects of the described techniques may be applied to any configuration of TDD/FDD carriers in the PUCCH group.

In some aspects, this may include configuring PUCCH resources on each carrier in the PUCCH group to support PUCCH transmissions on a secondary carrier. For example, the UE 520 may receive a signal from the base station 505 that configures a first set of resources for transmitting the feedback message on the primary carrier (e.g., on PCC), a second set of resources for transmitting the feedback message on the secondary carrier (e.g., SCC1), a third set of resources for transmitting the feedback message on an additional secondary carrier (e.g., SCC2), and so forth. The resources may include time resources, frequency resources, spatial resources, and/or code resources, which are allocated for transmission of a PUCCH on the respective carrier. In some aspects, the UE 520 may select the primary (e.g., PCC) or secondary carrier (e.g., SCC1 and/or SCC2) for transmitting the feedback message based on the configured resources as well as the resources needed for transmitting the feedback message. For example, the UE 520 may determine the resource usage for transmitting the feedback message and select the primary and/or a secondary carrier for transmitting the feedback message based on the available resources configured for the primary carrier and/or secondary carrier(s).

In some aspects, the indication/determination of which carrier that the UE 520 will use for transmitting a PUCCH (e.g., including the feedback message) may be based on a predefined priority rule, may be dynamically indicated (e.g., in DCI), may be semi-statically indicated (e.g., using RRC signaling), and the like. Accordingly, UE 520 may determine the priority rule associated with transmitting the feedback message on the primary carrier and secondary carrier, and select the carrier for transmitting the feedback message based on the priority rule.

Accordingly, UE 520 may be configured (e.g., by the base station 505, which is the PCell in this example) with the default rule or the priority rule that, without additional signaling, may correspond to a first priority level associated with PCC, a second priority level associated with SCC1, a third priority level associated with SCC2, and the like. In some non-limiting examples, the first priority level may be a higher priority than the second priority level, the second priority level may be a higher priority than the third priority level, and so forth. In other non-limiting examples, the second priority level, or third priority level, etc., may be the highest priority level. That is, without additional signaling in DCI, RRC, and the like, if PUCCH transmission on the secondary carrier is enabled (e.g., via RRC signaling) for the UE 520, in the slot wherein the UE 520 is supposed to feedback HARQ-ACK, UE 520 may feedback the HARQ-ACK on a carrier which has enough uplink OFDM symbols to accommodate the RRC configured PUCCH resource, with the priority of carriers starting from PCC to SCC1 to SCC2 and so forth.

In some examples, however, the base station 505 may use signaling to override the priority rule for carrier selection when the UE 520 is to transmit a PUCCH. As one example, for dynamically scheduled PDSCH, in the DCI scheduling the PDSCH, the base station 505 may add a field to indicate the carrier index that the UE 520 will use to feedback HARQ-ACK. Accordingly, the UE 520 may receive a grant (e.g., DCI from the base station 505) scheduling the downlink transmission (e.g., PDSCH) and indicating the primary carrier (e.g., PCC) or the secondary carrier (e.g., SCC1 and/or SCC2) for transmitting the feedback message on a PUCCH. UE 520 may select the primary or secondary carrier based at least in part on the grant (e.g., DCI) overriding the priority rule, e.g., may select the carrier corresponding to the carrier index indicated in the DCI.

In another example, for semi-persistent CSI and/or aperiodic CSI on a PUCCH (e.g., a reference signal measurement report, such as a CSI-RS report), in the DCI activating/scheduling the semi-persistent CSI and/or aperiodic CSI, the base station 505 may add a field to indicate the carrier index that the UE 520 will use to transmit the CSI report on a PUCCH. For example, the UE 520 may receive a grant from the base station 505 activating semi-persistent resources for the downlink transmission and indicating the primary carrier (e.g., PCC) or the secondary carrier (e.g., SCC1 and/or SCC2) for transmitting the feedback message. In this example, the UE 520 may select the primary carrier and/or secondary carrier to transmit the feedback message based on the grant overriding the priority rule, e.g., may select the carrier corresponding to the carrier index indicated in the DCI.

In another example, for a periodic CSI on a PUCCH and/or ACK/NACK for semi-persistent scheduled (SPS) based PDSCH, in the RRC configuring the PUCCH or SPS, the base station 505 may add a field to indicate the carrier index for transmitting periodic CSI on a PUCCH. Accordingly, the UE 520 may receive a configuration signal from the base station 505 indicating semi-persistent resources for the downlink transmission and indicating the primary carrier (e.g., PCC will turn or the secondary carrier (e.g., SCC1 and/or SCC2) for transmitting the feedback message. In this example, the UE 520 may select the primary carrier and/or secondary carrier to transmit the feedback message based on the configuration signal overriding the priority rule, e.g., may select the carrier corresponding to the carrier index indicated in the DCI.

In some aspects, PUCCH transmission on a secondary carrier may be based on UE capability. For example, the UE 520 may transmit or otherwise convey a message to the base station 505 (e.g., the PCell in this example) indicating a UE capability for transmitting the feedback message using the primary and/or secondary carrier. The base station 505 may enable/disable, enable/disable, etc., PUCCH transmission on the secondary carrier for the UE 520, e.g., using RRC signaling, a MAC CE, DCI, and the like.

In some aspects, the UE 520 may have uplink transmissions of different traffic types, which may be transmitted on the secondary carrier in some examples. For example, the UE 520 may have URLLC, eMBB, etc., traffic for uplink transmission. In this situation, some examples may include allowing the uplink transmission (e.g., PUCCH and/or PUSCH) on a secondary carrier based on the traffic type (e.g., URLLC for delay reduction). In this example, the UE 520 may transmit the eMBB transmission on the PCC. Accordingly, the UE 520 may determine that the uplink transmission (e.g., URLLC) is scheduled to be transmitted to the base station 505 and that the uplink transmission has a corresponding traffic type supported for transmission on the secondary carrier. The UE 520 may, based on the traffic type, select the secondary carrier for transmission of the uplink transmission (e.g., the URLLC traffic). The UE 520 may determine that a second uplink transmission (e.g., eMBB traffic) is to be transmitted to the base station 505 and that the second uplink transmission has a corresponding second traffic type supported for transmission on the primary carrier. In this example, the UE 520 may select the primary carrier for transmission of the second uplink transmission according to its transmission type.

The examples of FIG. 5 illustrate that the primary and secondary component carriers may correspond to different signal paths between the UE and different base stations. Alternatively, and often more commonly, the primary and secondary component carriers correspond to a single signal path between the UE and one particular base station.

Figure 6:
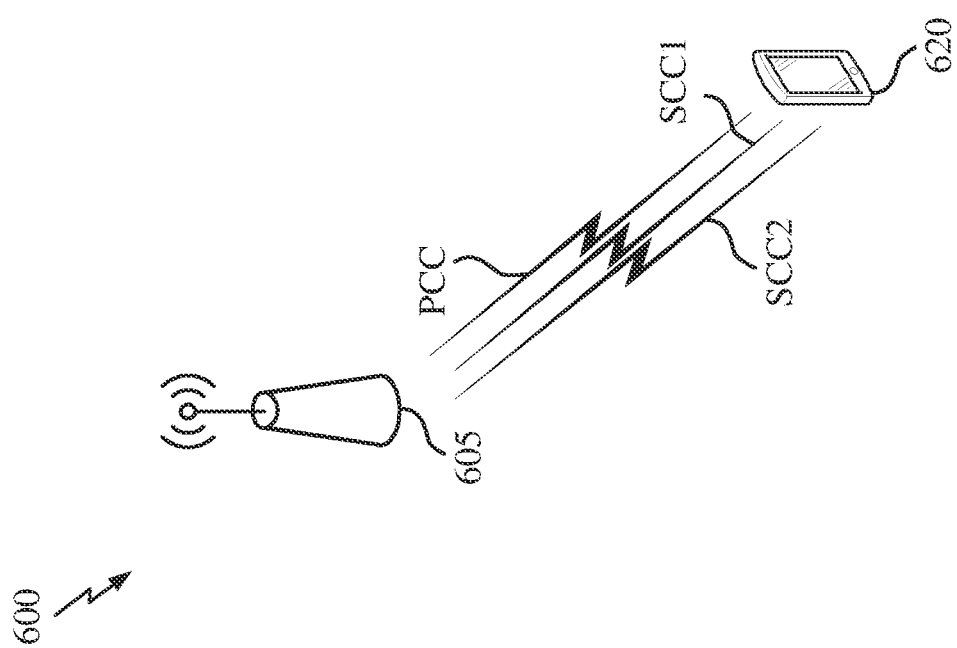
FIG. 6 is a diagram illustrating an example of a wireless communications system that supports uplink primary and second component carriers (PCC and SCC) to a single base station according to some aspects.

FIG. 6 illustrates an example of a wireless communications system 600 that supports primary and secondary component carriers between a UE and a particular (single) base station along a common signal transmission path. In some examples, the wireless communications system 600 may implement aspects of wireless communications systems of FIGS. 1-4. The wireless communications system 600 may include base station 605 and UE 620, which may be examples of corresponding devices described herein. In some aspects, the base station 605 and its transceivers may constitute or otherwise form a PUCCH group for the UE 620 to support multi-carrier communications using at least a primary carrier and one or more secondary carriers along the signal path therebetween. Generally speaking, the operation of the system of FIG. 6 can be the same as in FIG. 5, with the exception that signals are not relayed among multiple base stations as in FIG. 5.

PUCCH Transmissions on a PCC or an SCC

Figure 7:
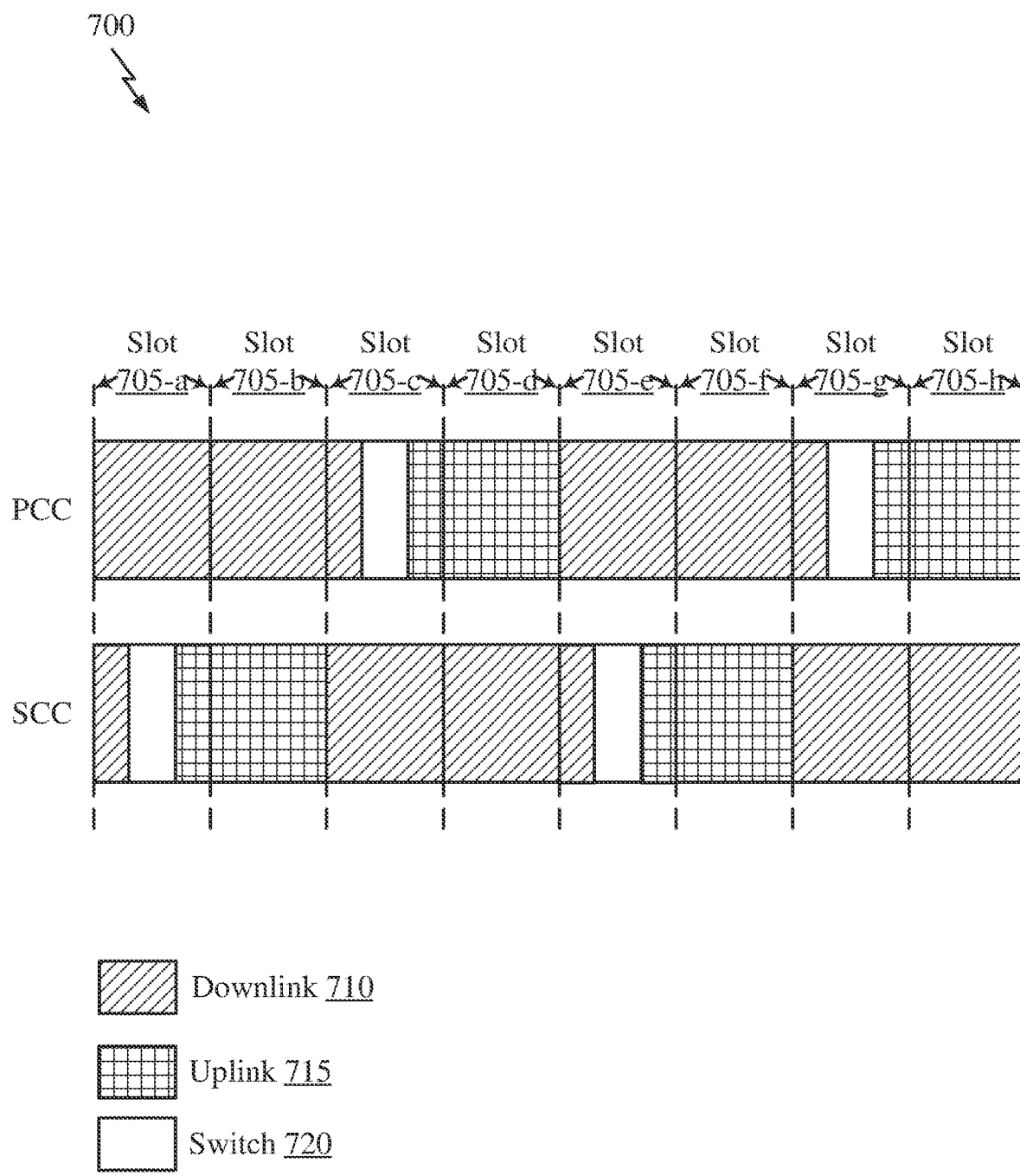
FIG. 7 illustrates an example of a carrier configuration that supports uplink control on secondary carrier according to some aspects.

FIG. 7 illustrates an example of a carrier configuration 700 that supports PCC and SCC transmissions. Aspects of carrier configuration 700 may be implemented by base station and/or UE, which may be examples of the corresponding devices described herein. For example, one or more base stations (e.g., cells) may constitute or otherwise form a PUCCH group for a UE that supports multi-carrier communication using at least a primary carrier and one or more secondary carriers. For example, the UE may receive a downlink transmission (e.g., PDCCH and/or PDSCH) during a downlink slot 705 (e.g., a slot configured with only downlink symbols) on the primary carrier (e.g., on PCC) and/or on secondary carrier(s) (e.g., on SCC) from cell(s) of the PUCCH group. The UE may identify or otherwise determine feedback information (e.g., ACK/NACK information based on whether the UE is able to successfully decode the downlink transmission, a channel measurement report associated with the downlink transmission (such as a CSI-RS measurement report), and the like) based on the downlink transmission. The UE may then select the primary carrier (e.g., PCC) and/or the secondary carrier (e.g., SCC2) for transmitting the feedback information to the base station. Accordingly, the UE may select the primary carrier and/or the secondary carrier for transmitting a feedback message (e.g., the PUCCH transmission) including the feedback information to the base station (depending on which carrier the UE chooses for the PUCCH transmission).

In some aspects, this may include, when using TDD for uplink carrier aggregation (e.g., when all CCs in the PUCCH group are TDD carriers), the base station (the PCell in this example) may configure a TDD pattern in a staggering/complementary fashion (e.g., in the time domain) such that there are a maximum number of slots 715 supporting uplink transmissions across all carriers. The base station may transmit or otherwise convey the signal configuring the slot format patterns, e.g., in RRC signaling, a MAC CE, DCI, and the like, to the UE. In one non-limiting example, this may include the base station configuring the slot format pattern such that there is at least one carrier available for the UE to use for an uplink transmission in each slot 705. For example, the UE may receive a signal configuring slot format patterns for the primary and/or secondary carrier(s), wherein the slot format patterns for the different carriers are selected such that instances of uplink transmission opportunities 715 are staggered to occur more frequently.

Carrier configuration 700 illustrated in FIG. 7 provides one example of a slot format pattern that may be signaled to the UE in accordance with aspects of the described techniques. The slot format pattern may include a first slot format pattern for the primary carrier and the second slot format pattern for the secondary carrier. For example, the first slot format pattern for the primary carrier (e.g., PCC) may include downlink transmission opportunities 710 being configured for slot 705-*a*, slot 705-*b*, a first subset of the initial symbols of slot 705-*c*, slot 705-*e*, slot 705-*f*, and a first subset of the initial symbols of slot 705-*g*. The second slot format pattern for the secondary carrier (e.g., SCC) may include downlink transmission opportunities 710 being configured for a first subset of the initial symbols of slot 705-*a*, slot 705-*c*, slot 705-*d*, a first subset of the initial symbols of slot 705-*e*, slot 705-*g*, and slot 705-*h*.

The first slot format pattern for the primary carrier (e.g., PCC) may include uplink transmission opportunities 715 being configured for a second subset of the last symbols of slot 705-*c*, slot 705-*d*, a second subset of the last symbols of slot 705-*g*, and slot 705-*h*. The second slot format pattern for the secondary carrier (e.g., SCC) may include uplink transmission opportunities 715 being configured for a second subset of the last symbols of slot 705-*a*, slot 705-*b*, a second subset of the last symbols of slot 705-*e*, and slot 705-*f*.

The first slot format pattern for the primary carrier (e.g., PCC) may include a switching period 720 configured during slot 705-*c* and slot 705-*g* (e.g., during a third subset of the middle symbols of slot 705-*c* and 705-*g*). The second slot format pattern for the secondary carrier (e.g., SCC) may include a switching period 720 configured during slot 705-*a* and slot 705-*e* (e.g., during a third subset of the middle symbols of slot 705-*a* and 705-*e*). Accordingly, the first slot format pattern for the primary carrier and the secondary slot format pattern for the secondary carrier together include staggering instances of uplink transmission opportunities 715 for transmitting the feedback message in the time domain. In a non-limiting example illustrated in FIG. 7, the first slot format pattern and second slot format pattern provide instances of uplink transmission opportunities 715 for transmitting the feedback message in the time domain that occur every other slot 705.

It should be understood that when additional secondary carrier(s) are provided or otherwise configured within the PUCCH group, additional slot format patterns may be configured for the additional secondary carrier(s) that reduces the instances between uplink slots 715 being configured across the carriers.

Figure 8:
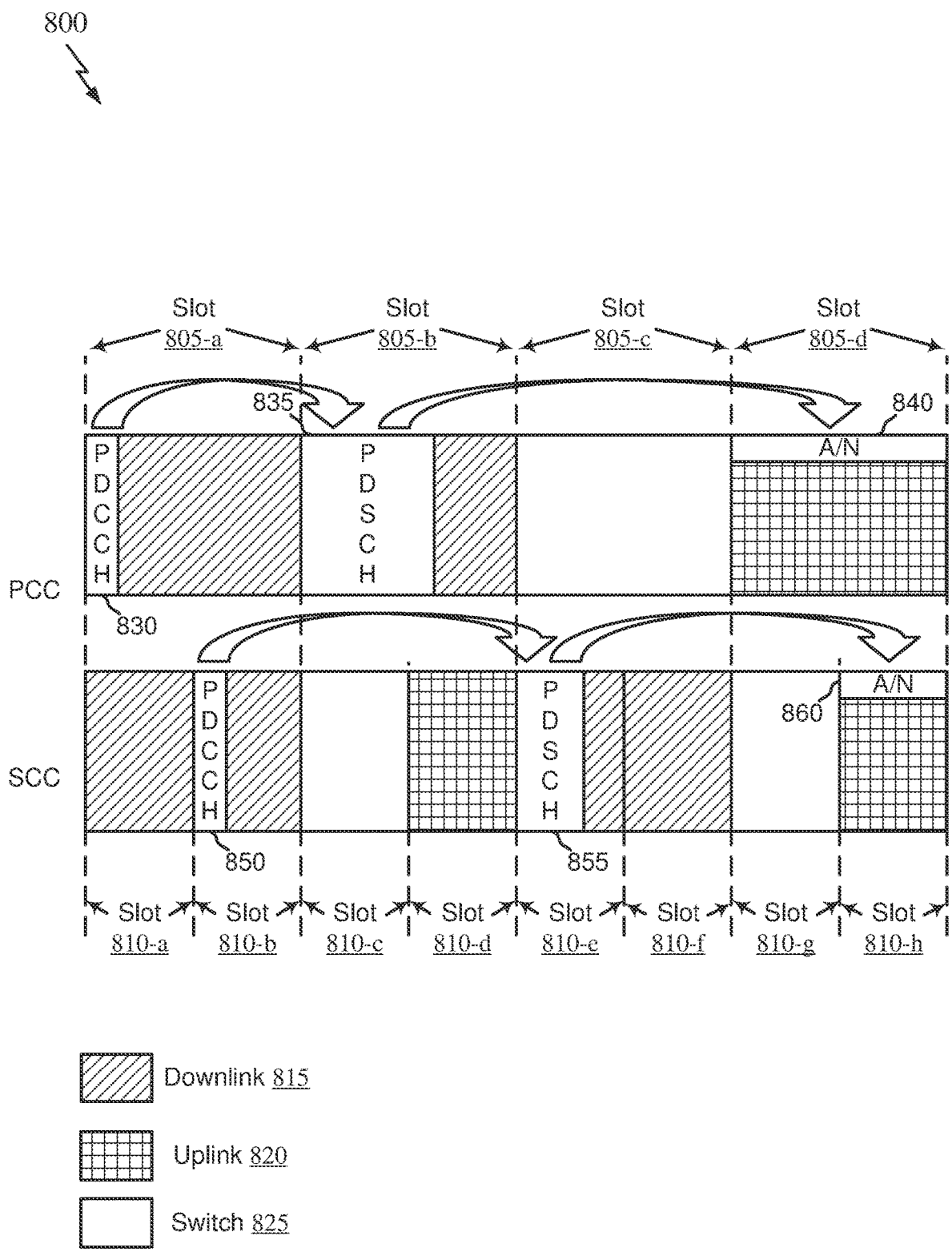
FIG. 8 illustrates another example of a carrier configuration that supports uplink control on secondary carrier according to some aspects.

FIG. 8 illustrates an example of a carrier configuration 800 that supports PCC and SCC transmissions. Aspects of carrier configuration 800 may be implemented by a base station and/or UE, which may be examples of the corresponding devices described herein. For example, one or more base stations (e.g., cells) may constitute or otherwise form a PUCCH group for a UE that support multi-carrier communications using at least a primary carrier and one or more secondary carriers. Moreover, some carriers may be configured for TDD wherein each transmission opportunity (e.g., each symbol, mini slot, slot, etc.) is designated as either a downlink transmission opportunity 815, an uplink transmission opportunity 820, or a switching period 825 (e.g., may be used for uplink or downlink communications, may include a switching gap for the UE to retune from downlink transmissions to uplink transmissions (or vice versa), and the like). Moreover, some carriers in the PUCCH group may be configured with different sub-carrier spacing (SCS) configurations, which may result in slots having different durations. In the non-limiting example illustrated in FIG. 8, the primary carrier (e.g., PCC) has a SCS providing for a duration of slot 805 on PCC that is twice as long as the duration of slot 810 on the secondary carrier having a different SCS. For example, slot 810-a and slot 810-b of SCC may have durations that span the same duration as slot 805-a of PCC in the time domain, slot 810-c and slot 810-d of SCC may have durations that span the same duration as slot 805-b of PCC in the time domain, slot 810-e and slot 810-f of SCC may have durations that span the same duration as slot 805-c of PCC in the time domain, and slot 810-g and slot 810-h of SCC may have durations that span the same duration as slot 805-d of PCC in the time domain.

For example, the UE may receive a downlink transmission (e.g., PDCCH 830 during slot 805-a scheduling PDSCH 835 during slot 805-b and/or PDCCH 850 during slot 810-b scheduling PDSCH 855 during slot 810-e) during one or more downlink transmission opportunities 815 on the primary carrier (e.g., on PCC) and/or on secondary carrier(s) (e.g., on SCC) from cell(s) of the PUCCH group).

The UE may identify or otherwise determine feedback information 840/860 (e.g., ACK/NACK information based on whether the UE is able to successfully decode the downlink transmission, a channel measurement report associated with the downlink transmission (such as a CSI-RS measurement report), and the like) for the respective downlink transmission(s). The UE may then select the primary carrier (e.g., PCC) and/or the secondary carrier (e.g., SCC) for transmitting the feedback information 840/860 to the base station. Accordingly, the UE may select the primary carrier and/or the secondary carrier for transmitting a feedback message (e.g., the PUCCH transmission) including the feedback information 840/860 to the base station (depending on which carrier the UE chooses for the PUCCH transmission). For example, the UE may transmit acknowledgement information (e.g., ACK/NACK) 840 for the PDSCH 835 during slot 805-d on the PCC, and acknowledgement information (e.g., ACK/NACK) 860 for the PDSCH 855 during slot 810-h on the SCC.

In some aspects, this may result in overlapped uplink transmission opportunities 820 on the primary carrier and secondary carrier. In this instance, the UE may identify of otherwise select the primary carrier (e.g., PCC) and the secondary carrier (e.g., SCC) for transmitting the feedback message. The UE may transmit the feedback message on both the primary carrier and the secondary carrier. In some aspects, different options may be supported for transmission of the feedback message on the primary carrier and the secondary carrier.

In one example, the UE may transmit HARQ-ACK in parallel on PCC/SCC separately (e.g., not combining the multiple HARQ-ACK codebooks into one). For example, the UE may implement separate codebook construction and downlink assignment indicator (DAI) mechanisms on a per-carrier basis. This may include the UE receiving the downlink transmission (e.g., PDCCH 830 scheduling PDSCH 835 and acknowledgment information 840) on the PCC and determining the acknowledgment information 840 for the downlink transmission (e.g., based on whether or not the UE was able to successfully receive and decode PDCCH 830 and PDSCH 835). The UE may construct a first codebook for the downlink transmission(s) on the PCC and transmit an indication of that codebook in the acknowledgment information 840 provided in the feedback message transmitted during slot 805-d. For the SCC, this may include the UE receiving the downlink transmission (e.g., PDCCH 850 scheduling PDSCH 855 and acknowledgment information 860) on the SCC and determining the acknowledgment information 860 for the downlink transmission (e.g., based on whether or not the UE was able to successfully receive and decode PDCCH 850 and PDSCH 855). The UE may construct a second codebook for the downlink transmission of the SCC and transmit an indication of that codebook in the acknowledgment information 860 provided in the feedback message transmitted during slot 810-h. Accordingly, the UE may transmit a first feedback message using a first codebook generated based at least in part on downlink transmission(s) received on the primary carrier. The UE may transmit a second feedback message using a second codebook generated based at least in part on downlink transmission(s) received on the secondary carrier.

In other examples, when multiple DCIs/RRCs point to HARQ-ACK transmissions in overlapped uplink transmission opportunities 820 or switching periods 825, the UE may transmit a combined HARQ-ACK codebook in the HARQ-ACK resources following the most recently received DCI. For example, the UE may implement a single codebook construction/DAI mechanism for the downlink transmissions received on the PCC and SCC. This may include the UE receiving the downlink transmission (e.g., PDCCH 830 scheduling PDSCH 835 and acknowledgment information 840) on the PCC and the downlink transmission (e.g., PDCCH 850 scheduling PDSCH 855 and acknowledgment information 860) on SCC. The UE may determine the acknowledgment information 840/460 for the downlink transmissions (e.g., based on whether or not the UE was able to successfully receive and decode PDCCH 830, PDSCH 835, PDCCH 850, and/or PDSCH 855). The UE may construct a combined codebook for the downlink transmission(s) on the PCC and SCC and transmit an indication of that combined codebook in the acknowledgment information 840 provided in the feedback message transmitted during slot 805-d and in the acknowledgment information 860 provided in the feedback message transmitted during slot 810-h. In this example, acknowledgment information 840 is the same as acknowledgment information 860, e.g., a combined codebook. Accordingly, the UE may transmit the feedback message on the primary carrier and the secondary carrier using the combined codebook generated based at least in part on downlink transmission(s) received on the primary carrier and secondary carrier.

Power Control for PUCCH on an SCC

Figure 9:
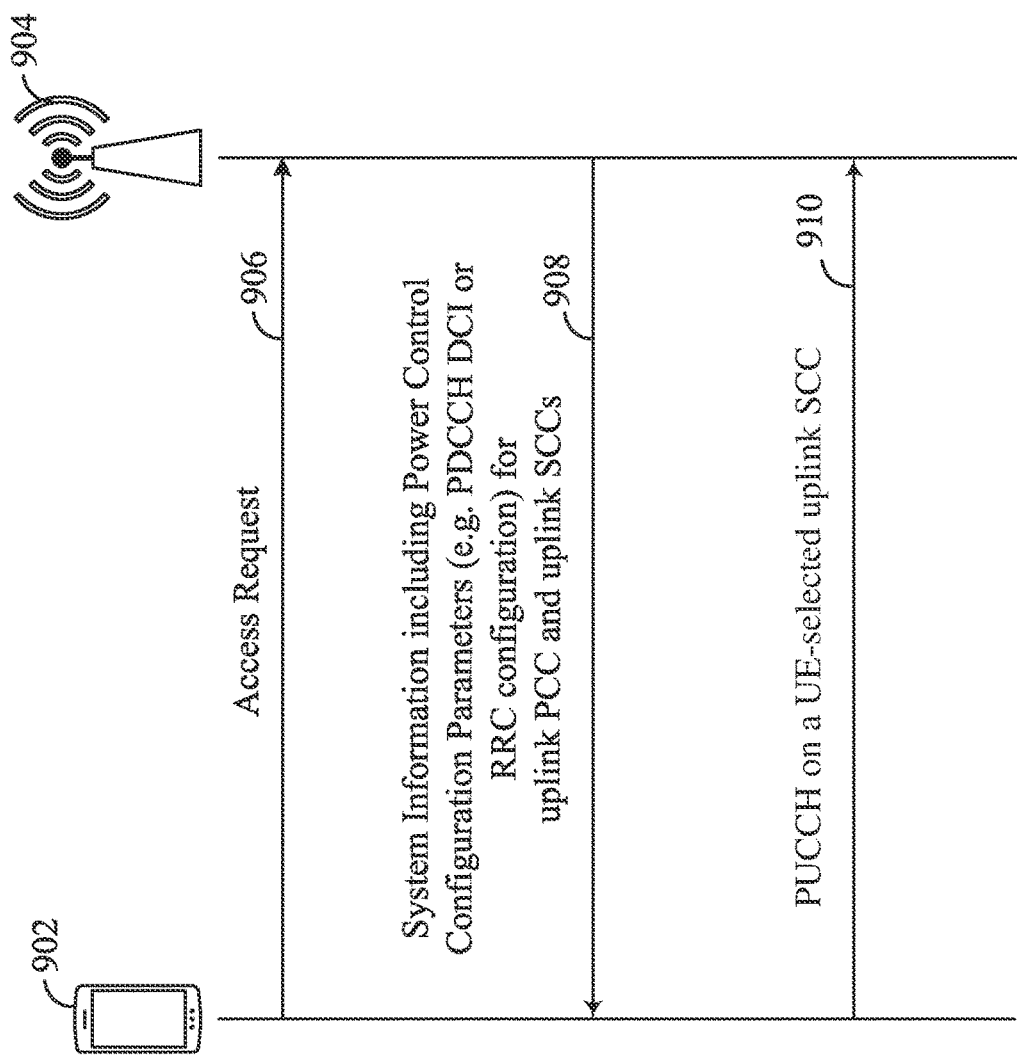
FIG. 9 is a timing diagram illustrating a procedure according to some aspects wherein power control is provided for a PUCCH of an SCC.

FIG. 9 is a diagram providing a high-level overview of power control for PUCCH transmissions on an SCC according to some aspects. A UE 902 may attempt at 906 to connect to a base station 904 using an initial access procedure (e.g., a RACH procedure). The base station 904 may transmit at 908 (and the UE may receive) a downlink transmission such as a PDCCH on a primary carrier and/or or secondary carrier that includes System Information (e.g., PDCCH DCI for closed-loop power control and RRC configuration for open-loop power control) including power control configuration parameters for the PCC and for all SCCs. Exemplary power control configuration parameters are discussed below. After the UE receives and decodes the system information from the base station, the UE may select a particular carrier (e.g., a particular SCC) for sending a PUCCH and then send the PUCCH at 910 on the UE-selected SCC.

Although not shown in FIG. 9, each of the operations of the figure may include various intermediate stages or operations and various intermediate transmissions in accordance with 5G NR standards (or other applicable standards). For example, the UE may provide acknowledgment feedback to the base station to indicate that the UE successfully received and decoded the PDCCH of downlink transmission of 908. The acknowledgment information may be positive acknowledgment information (e.g., ACK) or negative acknowledgment information (e.g., NACK) of the type described above. The UE may then select (based on the acknowledgment and on path loss measurements made using various reference signals) a particular secondary carrier for transmitting the subsequent PUCCH at 910. The PUCCH sent at 910 on the selected uplink SCC is transmitted by the UE while controlling the transmission power in accordance with the power control configuration parameters of the SCC provided by the base station. Furthermore, although not shown, various beam refinement operations may be performed.

In an illustrative example, wherein the wireless system is configured in accordance with 5G NR, power control for PUCCH transmissions may be performed in accordance with open-loop or closed-loop power control procedures.

For open-loop power control, an open-loop target receiver power ($P_O$) may be specified by the base station, which is the sum of the following two components: a nominal PUCCH power value ($P_{O\_nominal\_PUCCH}$) for use by all UEs in communication with the base station and a UE-specific power value ($P_{O\_UE\_nominal\_PUCCH}$), which is a value chosen from a p0-Set value. In some examples, in accordance with 5G NR standards and specifications, a cardinality of the set associated with P0-Set is maxNrofPUCCH-P0-PerSet. For each entry in the P0-Set, the set includes {p0-PUCCH-Id, p0-PUCCH-Value}. In a wireless system that only permits PUCCH on the PCC, the aforementioned open-loop power control parameters are specified by the base station for use with the PCC. For a wireless system as disclosed herein wherein a PUCCH may be sent on a SCC, the aforementioned parameters (or other suitable parameters) may be indicated by the base station using one or more mechanisms or techniques, which can be specified in revised and updated standards such as in 3GPP 5G NR Release 17 and later.

In some open-loop power control examples disclosed herein, the base station is configured (via, e.g., RRC) to indicate that the same power control parameters are to be used by the UE for PUCCH for the PCC and for each SCC for open-loop power control. That is, power control parameters are used that are common to (or shared by) the PCC and SCCs. This can be particularly convenient when the base station serves as both the PCell and the SCells so that the PCC and each SCC are along the same signal path and hence suffer the same path loss, as in the scenario of FIG. 6. In other examples disclosed herein, the base station provides carrier-specific parameters to be used by the UE for the PCC and for each different SCC. That is, power control parameters are used that can differ among the PCC and each of the SCCs. Carrier-specific power control configurations can be used when the base station serves as both PCell and SCell but also may be useful if the PCell and the SCell are at different location so that the PCC and the SCCs are along different signal paths and hence suffer different path loss, as in the scenario of FIG. 5. Additionally, the open-loop power control parameters may specify carrier-specific spatial relationship information (PUCCH-SpatialRelationInfo) for the PCC and the SCCs. The carrier-specific spatial relationship information may include parameters for use by the UE for determining a carrier-specific reference signal (PUCCH-PathlossReferenceRS-Id) for measuring path loss on a particular component carrier between the UE and the base station. In some examples, based on the CC index wherein PUCCH is transmitted, the PUCCH-SpatialRelationInfo corresponds to the CC index that is used. PUCCH-SpatialRelationInfo may include three parameters {PUCCH-PathlossReferenceRS-Id, p0-PUCCH-Id, closedLoopIndex}: PUCCH-PathlossReferenceRS-Id is used to determine the RS on the PUCCH CC to measure pathloss; p0-PUCCH-Id is used to determine which p0-PUCCH-Value to use for the corresponding CC carrying the PUCCH; and closedLoopIndex indicates, for the current PUCCH transmitting on this CC, which power control closedloop index to use. (That is, in 5G NR, even with open-loop power control, a closedloop index may be specified.)

In some closed-loop power control examples disclosed herein, when scheduling DL PDSCH, it is sufficient to use a single dynamic power control command in DL DCI for A/N (ACK/NACK) feedback for the scheduled PDSCH. The single power control command may be applied on whichever CC (e.g., PCC, SCC1, SCC2, etc.) carries the A/N feedback. If accumulative closed-loop power control is indicated by the base station, the power control command only accumulates within each CC. The power control command is not accumulated across CCs. For example, the power control values are accumulated or summed for the PCC independently than for SCC1 and independently for SCC2, and so on. In some aspects, the power control command is signaled by the base station in DCI. In other closed-loop power control examples, rather than using accumulative dynamic power control command, an absolute dynamic power control command is employed. With absolute dynamic power control, the power control values are not accumulated either within a particular CC or across CCs.

Note also that the UE's final Tx power is equal to $P_O$+ pathloss+ dynamic power control loop output. In some aspects, the power control command is used to dynamically adjust PUCCH Tx power on top of $P_O$. In some aspects, a UE is configured with two dynamic power control loops for PUCCH transmissions (e.g., one loop for URLLC and another loop for eMBB).

Figure 10:
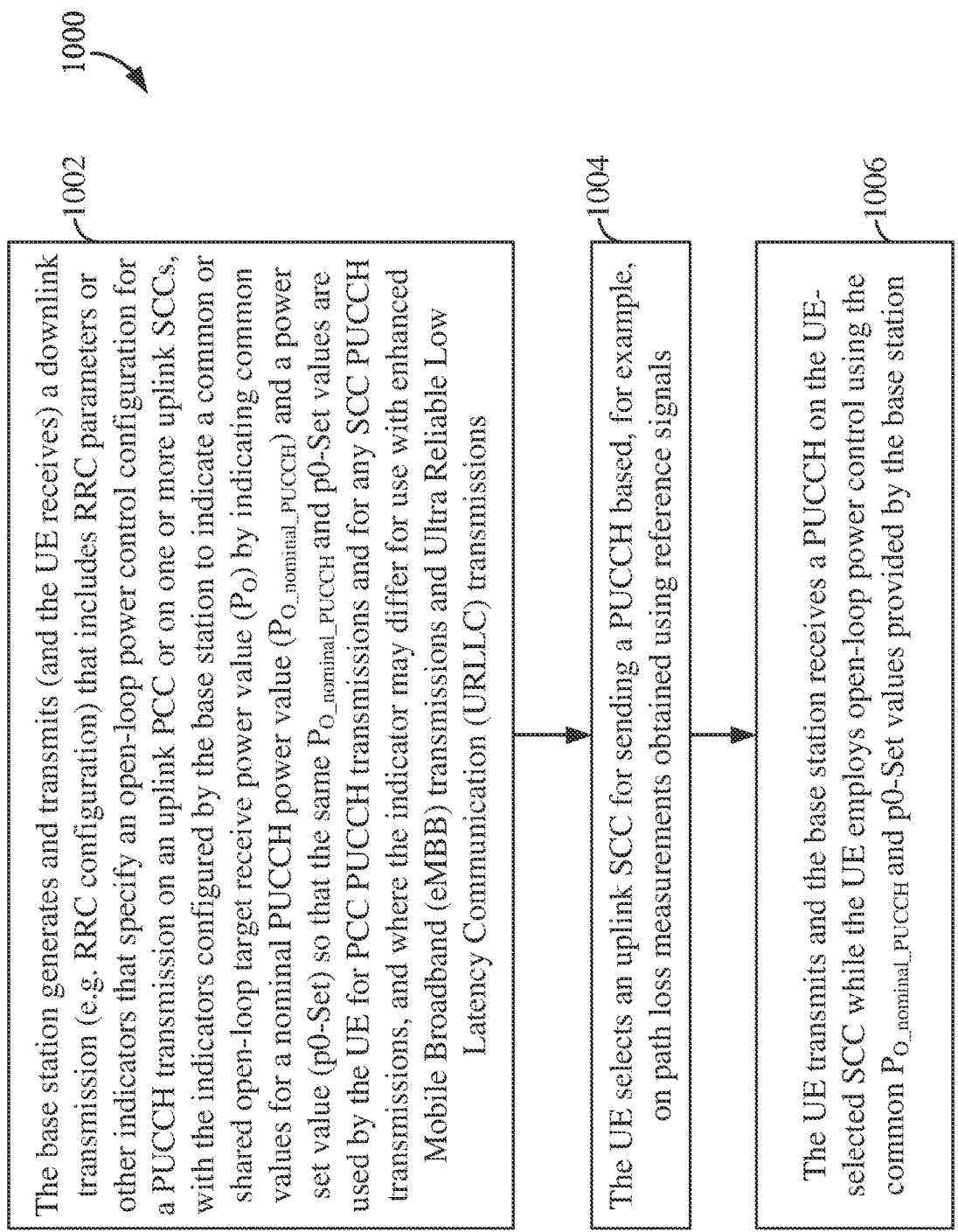
FIG. 10 is a flow chart illustrating a procedure according to some aspects wherein open-loop power control is provided for a PUCCH of an SCC.

The various exemplary open-loop or closed-loop procedures for PUCCH transmissions on an uplink SCC are set forth in FIG. 10 and following.

FIG. 10 is a diagram illustrating an exemplary open-loop power control procedure for uplink PUCCH on an SCC according to some aspects wherein common or shared power control parameters are applied to the PCC and any SCCs. At 1002, the base station generates and transmits (and the UE receives) a downlink transmission (e.g., RRC configuration) that includes RRC parameters or other indicators that specify an open-loop power control configuration for a PUCCH transmission on an uplink PCC and on one or more uplink SCCs. The indicators are configured by the base station to indicate a common (or shared) open-loop target receive power value ($P_O$) by indicating common values for a nominal PUCCH power value ($P_{O\_nominal\_PUCCH}$) and a power set value (p0-Set) so that the same $P_{O\_nominal\_PUCCH}$ and p0-Set values are used by the UE for PCC PUCCH transmissions and for any SCC PUCCH transmissions. In some aspects, the indicator may differ for use with eMBB transmissions and URLLC transmissions (e.g., one indicator for a power control loop for URLLC and another indicator for a power control loop for eMBB). At 1004, the UE selects an uplink SCC for sending a PUCCH based, for example, on path loss measurements obtained using reference signals (in accordance with exemplary techniques described above). At 1006, the UE transmits and the base station receives a PUCCH on the UE-selected SCC while the UE employs open-loop power control using the common or shared $P_{O\_nominal\_PUCCH}$ and p0-Set values provided by the base station. Further details were provided above. This procedure is particularly useful in systems wherein the base station serves as the PCell and the SCell and so any path loss for PCC and SCC is sufficiently similar so that common open-loop power control parameters may be used. That is, in some aspects, the features of FIG. 10 may be utilized by a base station that serves as the PCell and the SCell so that any path loss for PCC and SCC is sufficiently similar so common open-loop power control parameters may be used.

Figure 11:
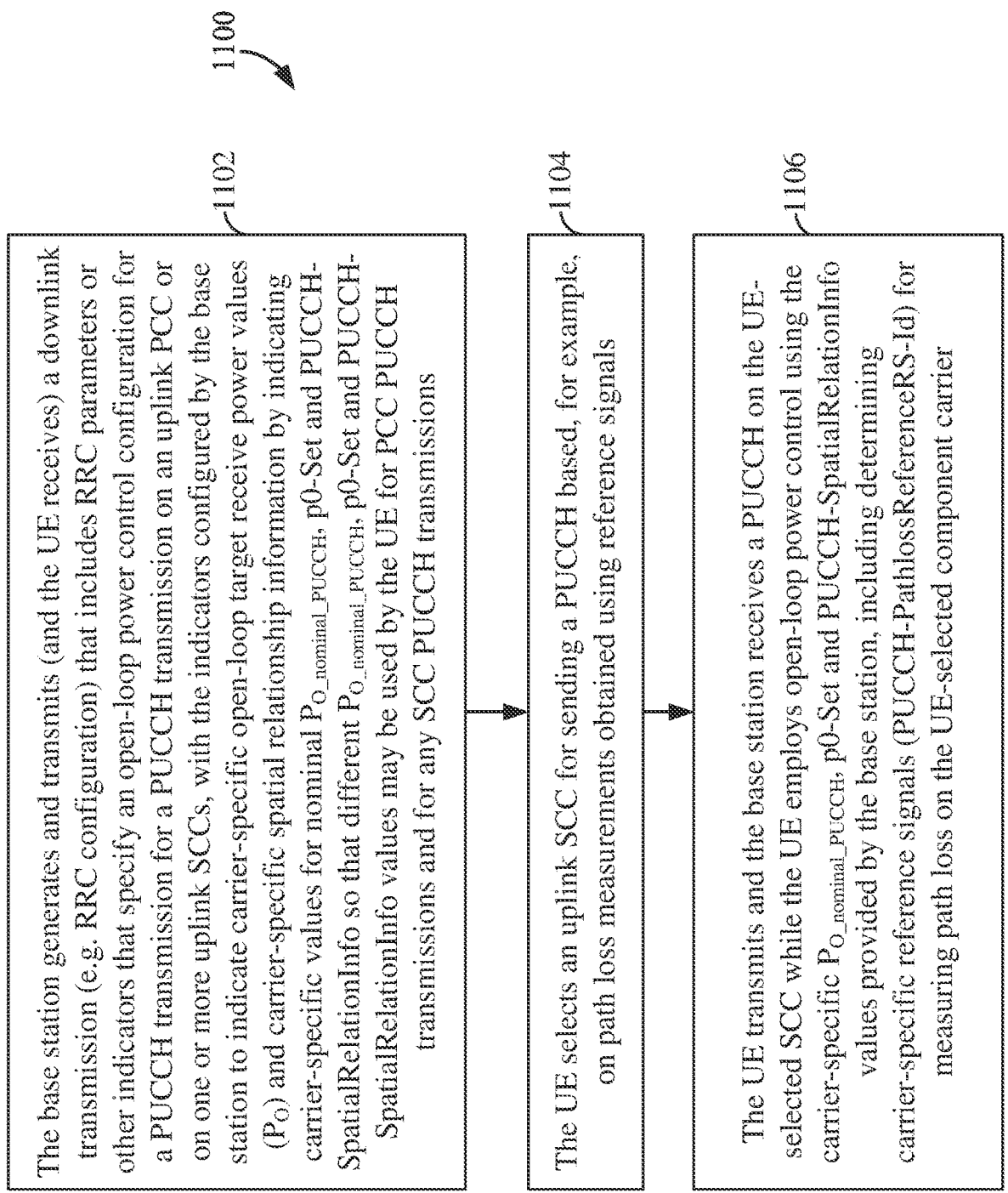
FIG. 11 is a flow chart illustrating another procedure according to some aspects wherein open-loop power control is provided for a PUCCH of an SCC.

FIG. 11 is a diagram illustrating an exemplary open-loop power control procedure for uplink PUCCH on an SCC according to some aspects wherein carrier-specific power control parameters are applied separately to the PCC and to any SCCs. At 1102, the base station generates and transmits (and the UE receives) a downlink transmission (e.g. RRC configuration) that includes RRC parameters or other indicators that specify an open-loop power PC configuration for a PUCCH transmission on a PCC and one or more SCCs, wherein the indicators are configured by the base station to indicate carrier-specific open-loop target receive power values ($P_O$) and carrier-specific spatial relationship information by indicating carrier-specific values for nominal $P_{O\_nominal\_PUCCH}$, p0-Set and PUCCH-SpatialRelationInfo so that different $P_{O\_nominal\_PUCCH}$, p0-Set and PUCCH-SpatialRelationInfo values may be used by the UE for PCC PUCCH transmissions and for any SCC PUCCH transmissions. At 1104, the UE selects an uplink SCC for sending a PUCCH based, for example, on path loss measurements obtained using reference signals (in accordance with exemplary techniques described above). At 1106, the UE transmits and the base station receives a PUCCH on the UE-selected SCC while the UE employs open-loop power control using the carrier-specific $P_{O\_nominal\_PUCCH}$, p0-Set and PUCCH-SpatialRelationInfo values provided by the base station, including determining carrier-specific reference signals (PUCCH-PathlossReferenceRS-Id) for measuring path loss on the UE-selected component carrier. Further details were provided above. As explained above, this procedure may be used in systems where a single base station serves as both PCell and the SCell but may also be used where the PCell and SCell are at different locations so that any path loss for PCC and SCC might differ.

Figure 12:
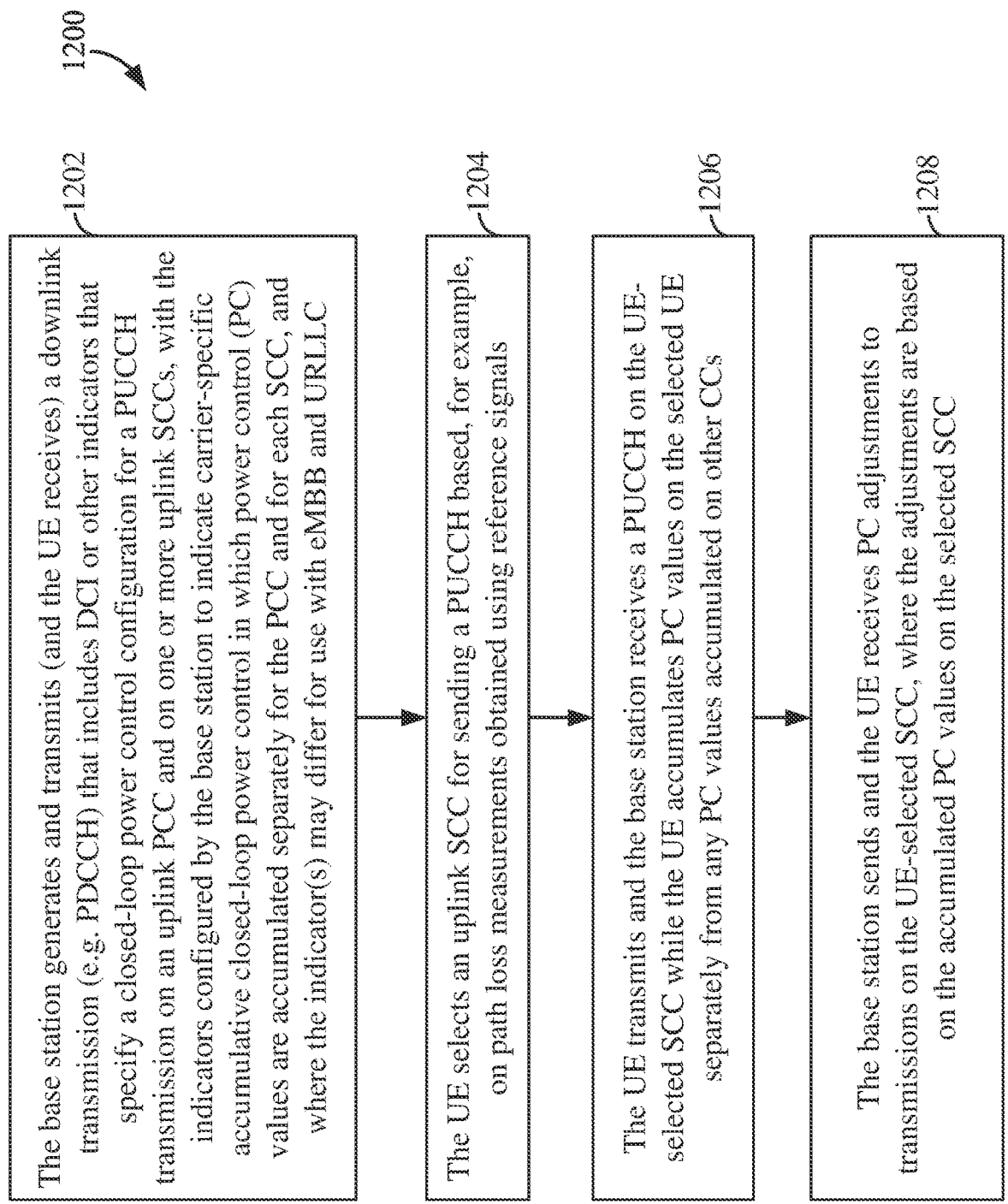
FIG. 12 is a flow chart illustrating a procedure according to some aspects wherein closed-loop power control is provided for a PUCCH of an SCC.

FIG. 12 is a diagram illustrating an exemplary closed-loop power control procedure for uplink PUCCH on an SCC according to some aspects wherein power control values are separately accumulated for the PCC and each SCC. At 1202, the base station generates and transmits (and the UE receives) a downlink transmission (e.g., PDCCH) that includes DCI or other indicators that specify a closed-loop power configuration for a PUCCH transmission, wherein the indicators are configured by the base station to indicate carrier-specific accumulative closed-loop power control in which power control (PC) values are accumulated separately for the PCC and for each SCC. In some aspects, the indicator may differ for use with eMBB transmissions and URLLC transmissions (as discussed above). At 1204, the UE selects an uplink SCC for sending a PUCCH based, for example, on path loss measurements obtained using reference signals (in accordance with exemplary techniques described above). At 1206, the UE transmits and the base station receives a PUCCH on the UE-selected SCC while the UE accumulates PC values on the selected UE separately from any PC values accumulated on other CCs. At 1208, the base station sends and the UE receives PC adjustments to transmissions on the UE-selected SCC, wherein the adjustments are based on the accumulated PC values on the selected SCC. For example, the base station may signal the UE to increase its transmission power for transmissions on the PCC but decrease transmission power for transmissions on the SCC. Hence, the features of FIG. 12 account for PC values from different CCs.

Figure 13:
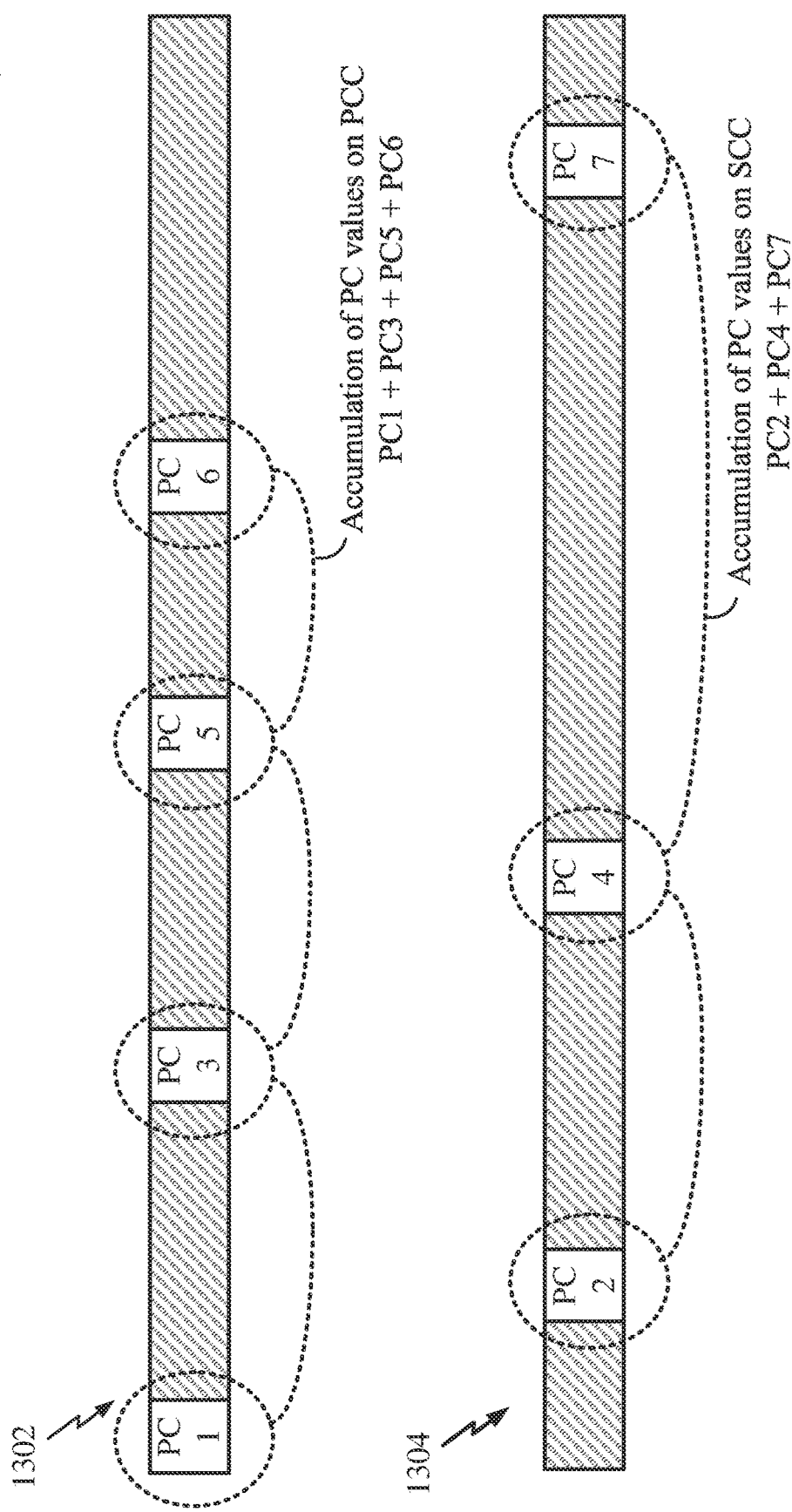
FIG. 13 is a block diagram illustrating carrier-specific power control aggregation on a PCC and an SCC according to some aspects.

FIG. 13 illustrates accumulative power control. A PUCCH group 1300 includes PCC transmissions 1302 and SCC transmissions 1304. The PCC transmissions 1302 include various PC values (PC1, PC3, PC5, and PC 6). The SCC transmissions 1304 include various other PC values (PC2, PC4, and PC 7). As shown by the dashed lines, the PC values of PCC (PC1+PC3+PC5+PC 6) are accumulated separately from the value (PC2+PC4+PC 7) of SCC. The accumulated values may be transmitted to the base station for use by the base station in controlling the UE's transmissions. For example, the base station may signal the UE to increase its power level for the PCC PUCCH transmissions while decreasing its power level for the SCC PUCCH transmissions, or vice versa. Although FIG. 13 shows only a single SCC, carrier-specific accumulation of PC values may be performed on each of a set of SCCs, such as on sixteen different SCCs.

Figure 14:
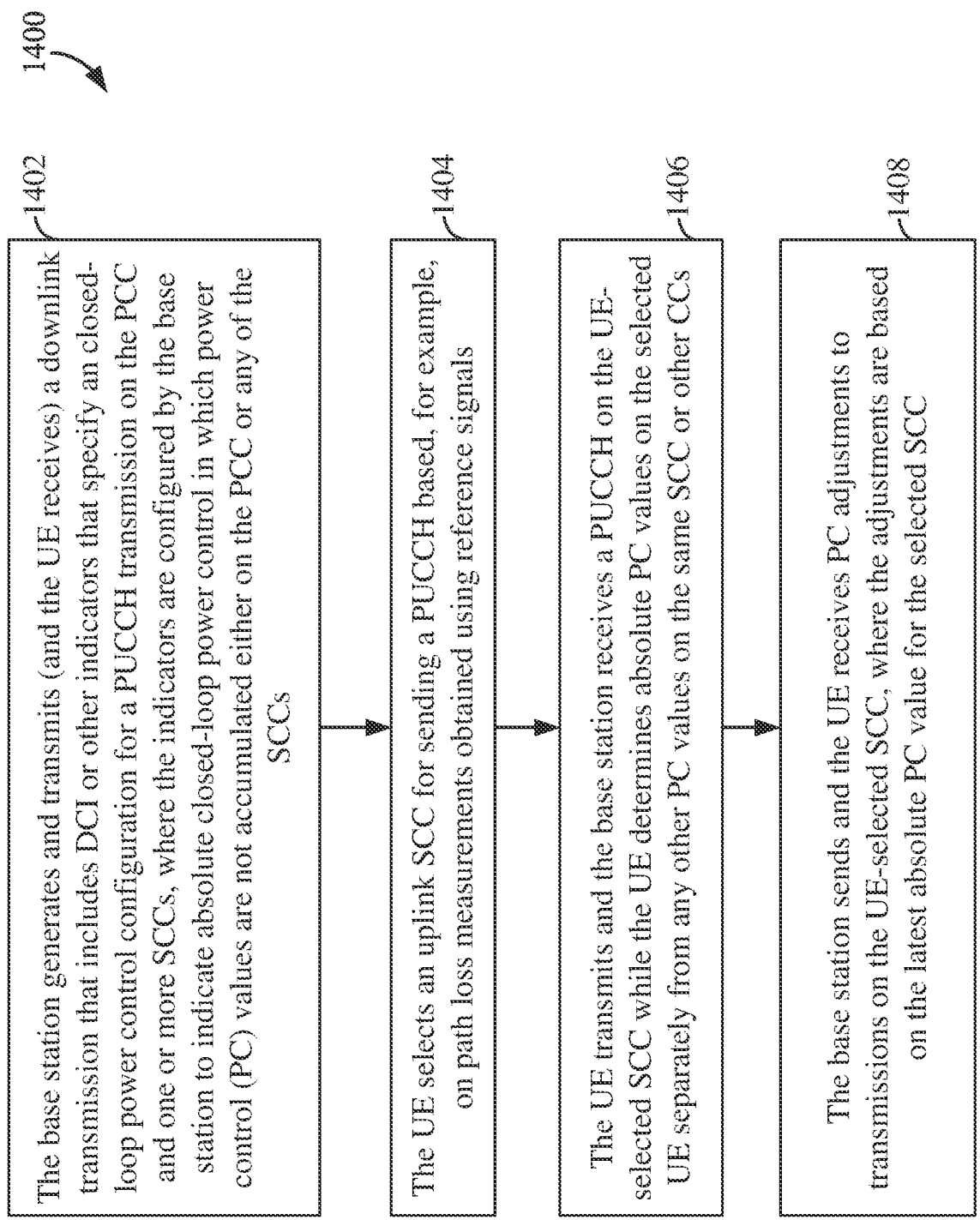
FIG. 14 is a flow chart illustrating another procedure according to some aspects wherein closed-loop power control is provided for a PUCCH of an SCC.

FIG. 14 is a diagram illustrating an exemplary closed-loop power control procedure for uplink PUCCH on an SCC according to some aspects wherein absolute closed-loop power control is performed. At 1402, the base station generates and transmits (and the UE receives) a downlink transmission (e.g., PDCCH) that includes DCI or other indicators that specify a closed-loop power configuration for a PUCCH transmission on the PCC and one or more SCCs, wherein the indicators are configured by the base station to indicate absolute closed-loop power control in which PC values are not accumulated either on the PCC or any of the SCCs. That is, the base station will respond to each individual PC value. At 1404, the UE selects an uplink SCC for sending a PUCCH based, for example, on path loss measurements obtained using reference signals (in accordance with exemplary techniques described above). At 1406, the UE transmits and the base station receives a PUCCH on the UE-selected SCC while the UE determines absolute PC values on the selected UE separately from any other PC values on the same SCC or other CCs. At 1408, the base station sends and the UE receives PC adjustments to transmissions on the UE-selected SCC, wherein the adjustments are based on the latest absolute PC values for the selected SCC. Hence, in some aspects, the features of FIG. 14 provide closed-loop power control for use with PCC and SCC.

Referring again briefly to FIG. 13, with absolute close-loop power control, each individual PC value (e.g., PC1, PC2, etc.) may be used to make adjustments to power levels, without the PC values being accumulated or added together (either collectively for all uplink CCs or separately for each individual CC).

Figure 15:
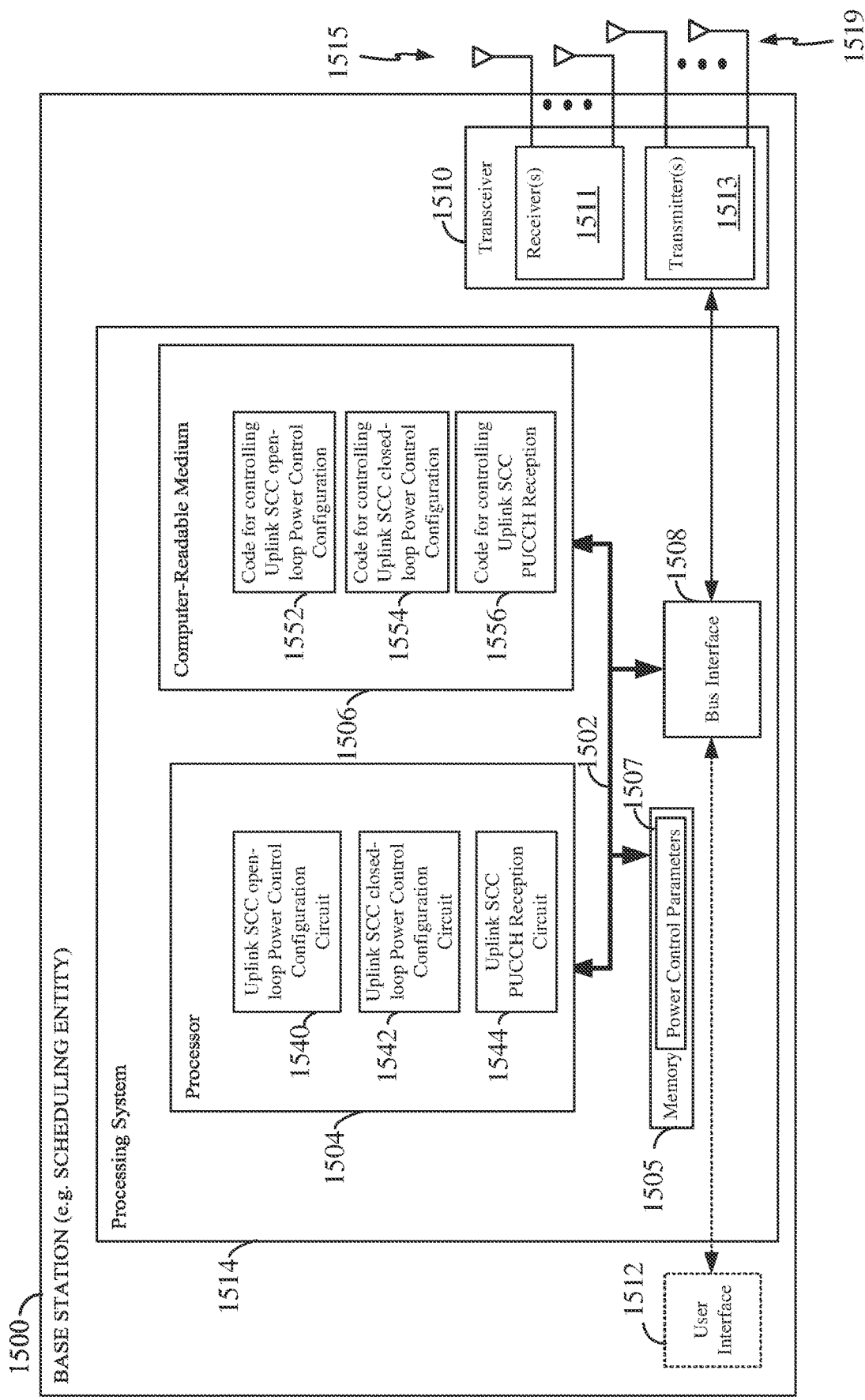
FIG. 15 is a block diagram illustrating an example of a hardware implementation for a base station (or other scheduling entity) according to some aspects.

FIG. 15 is a block diagram illustrating an example of a hardware implementation for a base station 1500 (e.g., scheduling entity) employing a processing system 1514. For example, the base station 1500 may be a scheduling entity or gNB as illustrated in any one or more of FIGS. 1-6 and 9.

The base station 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1500 may be configured to perform any one or more of the functions described herein. That is, the processor 1504, as utilized in a base station 1500, may be used to implement any one or more of the processes and procedures described and illustrated in FIGS. 7-14 and 17-18, discussed below.

The processor 1504 may in some instances be implemented via a baseband or modem chip and in other implementations, the processor 1604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In the example of FIG. 15, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well-known in the art, and therefore, will not be described any further. A bus interface 1508 provides an interface between the bus 1502 and a transceiver 1510. The transceiver 1510 provides a communication interface or means for communicating with various other apparatus over a transmission medium. The transceiver 1510 may be connected to an antenna array 1515 that can be configured for transmitting and/or receiving a plurality of beams (e.g., transmit beams and receive beams) using beamforming techniques. The transceiver 1510 includes one or more receivers 1511 and one or more transmitters 1513. The receiver(s) 1511 are coupled to a set of antennas 1515. The transmitter(s) 1513 are coupled to the same or a different set of antennas 1517. The sets of antennas may be used for beamforming. Different RF receiver chains may be provided within receivers 1511 for use with different CCs so that the base station 1500 may operate as both a PCell and one or more SCells to receive uplink signals from a UE on multiple CCs, including receiving PUCCH transmissions on an uplink SCC from a UE.

Depending upon the nature of the apparatus, a user interface 1512 (e.g., keypad, display, speaker, microphone, joystick) may also be provided. Of course, such a user interface 1512 is optional, and may be omitted in some examples, such as a base station.

In some aspects, the processor 1504 may include circuitry configured for various functions, including, for example, power control functions for use with uplink PUCCH transmissions on an SCC. For example, the circuitry may be configured to implement one or more of the base station functions described in relation to FIGS. 7-14 and 17-18, discussed below.

The processor 1504 may include an uplink SCC open-loop power control configuration circuit 1540 that can be configured to control SCC open-loop power control functions such as generating an open-loop power control configuration for a PUCCH transmission on SCC of a set of uplink component carriers and controlling the transceiver 1510 to transmit, to a UE, the indicator of the open-loop power control configuration for use by the UE for a PUCCH transmission on the SCC of a set of uplink component carriers that includes a PCC and the SCC.

The processor 1504 may include an uplink SCC closed-loop power control configuration circuit 1542 that can be configured to control SCC closed-loop power control functions such as generating a closed-loop power control configuration for a PUCCH transmission on the SCC of a set of uplink component carriers and controlling the transceiver 1510 to transmit, to a UE, an indicator of the closed-loop power control configuration for use by the UE for a PUCCH transmission on the SCC of a set of uplink component carriers that includes a PCC and the SCC.

The processor 1504 may include an uplink SCC PUCCH reception circuit 1544 that can be configured to control the transceiver to receive, based at least in part on the power control configuration, the PUCCH transmission from the UE on the secondary component carrier, and to then process the received SCC PUCCH to decode the information therein.

The processor 1504 may access power control parameters 1507 stored in memory 1505, such stored nominal power values and the like.

As noted above, in some wireless communications systems, a UE may be limited to transmitting uplink control information within, for example, a PUCCH, on a primary carrier. When the primary carrier is a TDD carrier (among other scenarios), this may result in a large delay for the PUCCH transmission due to the uplink/downlink/flexible slot configuration or pattern (e.g., an uplink transmission may not be allowed in a TDD slot configured with all downlink symbols). Also, in some systems, especially with UL CA, a PUCCH can only be transmitted on PCC in a PUCCH group, which may be limiting. Thus, the processor 1504 can be configured such that power control is provided so the UE can transmit uplink control information within a PUCCH on a secondary carrier (or on both a primary carrier and a secondary carrier) to address the aforementioned issues. For example, PUCCH resources may be configured on each carrier in a PUCCH group to support PUCCH transmissions on a secondary carrier. In some aspects, the processor 1504 provides circuitry to (a) generate and transmit, to a UE, an indicator of a power control configuration for use by the UE for a PUCCH transmission on a secondary component carrier of a set of uplink component carriers that comprises a primary component carrier and the secondary component carrier and (2) receive, based at least in part on the power control configuration, the PUCCH transmission from the UE on the secondary component carrier. In some aspects, the circuitry includes the uplink SCC open-loop power control configuration circuit 1540 and the uplink SCC PUCCH reception circuit 1544. In other aspects, the circuitry includes the uplink SCC closed-loop power control configuration circuit 1542 and the uplink SCC PUCCH reception circuit 1544. Note that additional circuitry, not shown in FIG. 15, may be provided for uplink PCC power control.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506. The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may also include, by way of example, a carrier wave, a transmission line, and any other suitable medium for transmitting software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable medium 1506 may include software executable by the processor 1504 configured to implement for one or more functions described elsewhere herein, including, for example, power control of SCC PUCCH. For example, software code or instructions may be configured to implement one or more of the functions described in relation to FIGS. 7-14 and 17-18.

The computer-readable medium 1506 may include code 1552 executable by the uplink SCC open-loop power control configuration circuit 1540 for controlling SCC open-loop power control functions such as generating an open-loop power control configuration for a PUCCH transmission on SCC of a set of uplink component carriers and controlling the transceiver 1510 to transmit, to a UE, the indicator of the open-loop power control configuration for use by the UE for a PUCCH transmission on the SCC of a set of uplink component carriers that includes a PCC and the SCC.

The computer-readable medium 1506 may include code or instructions 1554 executable by the uplink SCC closed-loop power control configuration circuit 1542 for controlling closed-loop power control functions such as generating a closed-loop power control configuration for a PUCCH transmission on the SCC of a set of uplink component carriers and controlling the transceiver 1510 to transmit, to a UE, an indicator of the closed-loop power control configuration for use by the UE for a PUCCH transmission on the SCC of a set of uplink component carriers that includes a PCC and the SCC.

The computer-readable medium 1506 may include code or instructions 1556 executable by the uplink SCC PUCCH reception circuit 1544 for controlling the transceiver 1510 to receive, based at least in part on the power control configuration, the PUCCH transmission from the UE on the secondary component carrier, and to then process the received SCC PUCCH to decode the information therein.

Note that the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one of the FIGS. 1-6 and 9, and utilizing, for example, the processes and/or algorithms described herein in relation to FIGS. 7-14 and 17-18.

In some aspects, the uplink SCC open-loop power control configuration circuit 1540 provides a means for generating an open-loop power control configuration for a PUCCH transmission on SCC of a set of uplink component carriers and for controlling the transceiver 1510 to transmit, to a UE, the indicator of the open-loop power control configuration for use by the UE for a PUCCH transmission on the SCC of a set of uplink component carriers that includes a PCC and the SCC.

In some aspects, the uplink SCC closed-loop power control configuration circuit 1542 provides a means for generating a closed-loop power control configuration for a PUCCH transmission on the SCC of a set of uplink component carriers and for controlling the transceiver 1510 to transmit, to a UE, an indicator of the closed-loop power control configuration for use by the UE for a PUCCH transmission on the SCC of a set of uplink component carriers that includes a PCC and the SCC.

In some aspects, the uplink SCC PUCCH reception circuit 1544 provides a means for receiving, based at least in part on the power control configuration, the PUCCH transmission from the UE on the secondary component carrier, and a means for processing the received SCC PUCCH to decode the information therein.

In some aspects, the processor 1504 provides a means for transmitting, to a UE, an indicator of a power control configuration for use by the UE for a PUCCH transmission on a secondary component carrier of a set of uplink component carriers that includes a primary component carrier and the secondary component carrier, and the transceiver 1510 provides a means for receiving, based at least in part on the power control configuration, the PUCCH transmission from the UE on the secondary component carrier.

Figure 16:
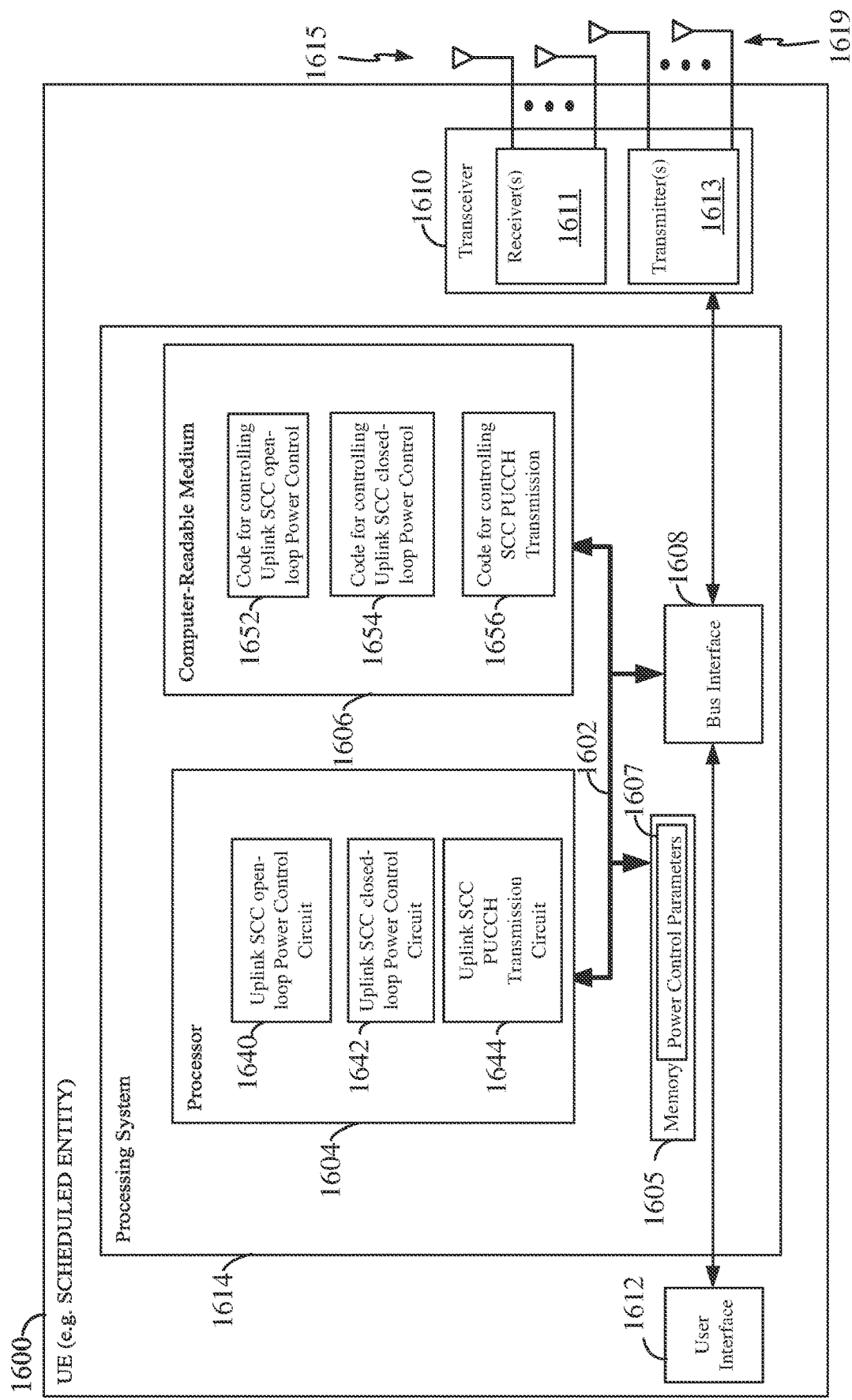
FIG. 16 is a block diagram illustrating an example of a hardware implementation for a UE (or other scheduled entity) according to some aspects.

FIG. 16 is a block diagram illustrating an example of a hardware implementation for an exemplary UE 1600 (e.g., scheduled entity) employing a processing system 1614. In accordance with various aspects, an element, or any portion of an element, or any combination of elements may be implemented with a processing system 1614 that includes one or more processors 1604. For example, the UE 1600 may be a UE as illustrated in any one or more of FIGS. 1-6 and 9.

The processing system 1614 may be generally similar to the processing system 1614 illustrated in FIG. 16, including a bus interface 1608, a bus 1602, memory 1605, a processor 1604, and a computer-readable medium 1606. Furthermore, the UE 1600 may include a user interface 1612 and a transceiver 1610 substantially similar to those described above in FIG. 16. The transceiver 1610 includes one or more receivers 1611 and one or more transmitters 1613. The receiver(s) 1611 are coupled to a set of antennas 1615. The transmitter(s) 1613 are coupled to the same or a different set of antennas 1617. The sets of antennas may be used for beamforming. The transceiver 1610 may include separate receive and transmit RF components or RF component chains such as receivers 1611 and transmitters 1613, as shown. Different RF transmit chains may be provided within transmitters 1613 for use with different CCs so that the UE 1600 may transmit uplink signals to one or more base stations on multiple CCs, including transmitting PUCCH transmissions on an uplink SCC.

Depending upon the nature of the apparatus, the user interface 1612 may include, e.g., a keypad, display, speaker, microphone, joystick, etc. The user interface 1512 is optional and may be omitted in some examples.

In some aspects, the processor 1604 may include circuitry configured for various functions, including, for example, power control functions for use with uplink PUCCH transmissions on an SCC. For example, the circuitry may be configured to implement one or more of the UE functions described in relation to FIGS. 7-14 and 17-18, discussed below.

The processor 1604 may include an uplink SCC open-loop power control circuit 1640 that can be configured to control SCC open-loop power control functions such as receiving, from a base station, an indicator of the open-loop power control configuration for use by the UE for a PUCCH transmission on the SCC of a set of uplink component carriers that includes a PCC and the SCC.

The processor 1604 may include an uplink SCC closed-loop power control circuit 1642 that can be configured to control SCC closed-loop power control functions such as controlling the transceiver 1610 to receive, from a base station, an indicator of a closed-loop power control configuration for use by the UE for a PUCCH transmission on the SCC of a set of uplink component carriers that includes a PCC and the SCC.

The processor 1604 may include an uplink SCC PUCCH transmission circuit 1644 that can be configured to control the transceiver to transmit, based at least in part on the power control configuration, a PUCCH transmission on the secondary component carrier to the base station.

The processor 1604 may store power control parameters 1607 received from the base station in memory 1605, such nominal power values and the like.

As discussed above, in some wireless communications systems, a UE may be limited to transmitting uplink control information within, for example, a PUCCH, on a primary carrier. When the primary carrier is a TDD carrier (among other scenarios), this may result in a large delay for the PUCCH transmission due to the uplink/downlink/flexible slot configuration or pattern (e.g., an uplink transmissions is not allowed in a downlink slot). Also, in some systems, especially with UL CA, a PUCCH can only be transmitted on PCC in a PUCCH group, which is limiting. Thus, the processor 1604 of FIG. 16 can be configured such that power control is provided so the UE can transmit uplink control information within a PUCCH on a secondary carrier (or on both a primary carrier and a secondary carrier) to address the aforementioned issues. In some aspects, the processor 1604 provides circuitry to (a) receive, from a base station, an indicator of a power control configuration for use by the UE for a PUCCH transmission on a secondary component carrier of a set of uplink component carriers that comprises a primary component carrier and the secondary component carrier and (b) transmit, based at least in part on the power control configuration, the PUCCH transmission to the base station on the secondary component carrier. In some aspects, the circuitry includes the uplink SCC open-loop power control circuit 1640 and the uplink SCC PUCCH transmission circuit 1644. In other aspects, the circuitry includes the uplink SCC closed-loop power control circuit 1642 and the uplink SCC PUCCH transmission circuit 1644. Note that additional circuitry, not shown in FIG. 15, may be provided for uplink PCC power control.

Note that the processor 1604 and its circuit components may, additionally or alternatively, be one or more controllers. As noted above, the same consideration applies to all circuits and processors or processing systems described herein.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software. For example, software code or instructions may be configured to implement one or more of the functions described in relation to FIGS. 7-14 and 17-18. The computer-readable medium 1606 may include code or instructions 1652 executable by processor 1604 for controlling UE-based operations for controlling SCC open-loop power control functions such as controlling the transceiver 1610 to receive, from a base station, an indicator of the open-loop power control configuration for use by the UE for a PUCCH transmission on the SCC of a set of uplink component carriers that includes a PCC and the SCC.

The computer-readable medium 1606 may include code or instructions 1652 executable by the uplink SCC open-loop power control circuit 1640 for controlling the transceiver 1610 to receive, from a base station, an indicator of an open-loop power control configuration for use by the UE for a PUCCH transmission on a secondary component carrier of a set of uplink component carriers that comprises a primary component carrier and the secondary component carrier and for processing the open-loop power control configuration for the PUCCH transmission on the SCC of a set of uplink component carriers.

The computer-readable medium 1606 may also include code or instructions 1654 executable by the uplink SCC closed-loop power control circuit 1642 for controlling the transceiver 1610 to receive, from a base station, an indicator of a closed-loop power control configuration for use by the UE for a PUCCH transmission on a secondary component carrier of a set of uplink component carriers that comprises a primary component carrier and the secondary component carrier and for processing the closed-loop power control configuration for the PUCCH transmission on the SCC of a set of uplink component carriers.

The computer-readable medium 1606 may include code or instructions 1656 executable by the uplink SCC PUCCH transmission circuit 1644 for controlling the transceiver 1610 to transmit, based at least in part on the power control configuration, the PUCCH transmission to the base station on the secondary component carrier.

Note that the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one of the FIGS. 1-6 and 9, and utilizing, for example, the processes and/or algorithms described herein in relation to FIGS. 7-14 and 17-18.

In some aspects, the uplink SCC open-loop power control circuit 1640 provides a means for receiving, from a base station, an indicator of the open-loop power control configuration for use by the UE for a PUCCH transmission on the SCC of a set of uplink component carriers that includes a PCC and the SCC.

In some aspects, the uplink SCC closed-loop power control circuit 1642 provides a means for receiving, from a base station, an indicator of a closed-loop power control configuration for use by the UE for a PUCCH transmission on the SCC of a set of uplink component carriers that includes a PCC and the SCC.

In some aspects, the uplink SCC PUCCH transmission circuit 1644 provides a means for transmitting, based at least in part on the power control configuration, the PUCCH transmission from the UE on the secondary component carrier.

In some aspects, the processor 1604 provides a means for receiving, from a base station, an indicator of a power control configuration for use by the UE for a PUCCH transmission on a secondary component carrier of a set of uplink component carriers that includes a primary component carrier and the secondary component carrier, and the transceiver 1610 provides a means for transmitting, based at least in part on the power control configuration, the PUCCH transmission to the base station on the secondary component carrier.

Figure 17:
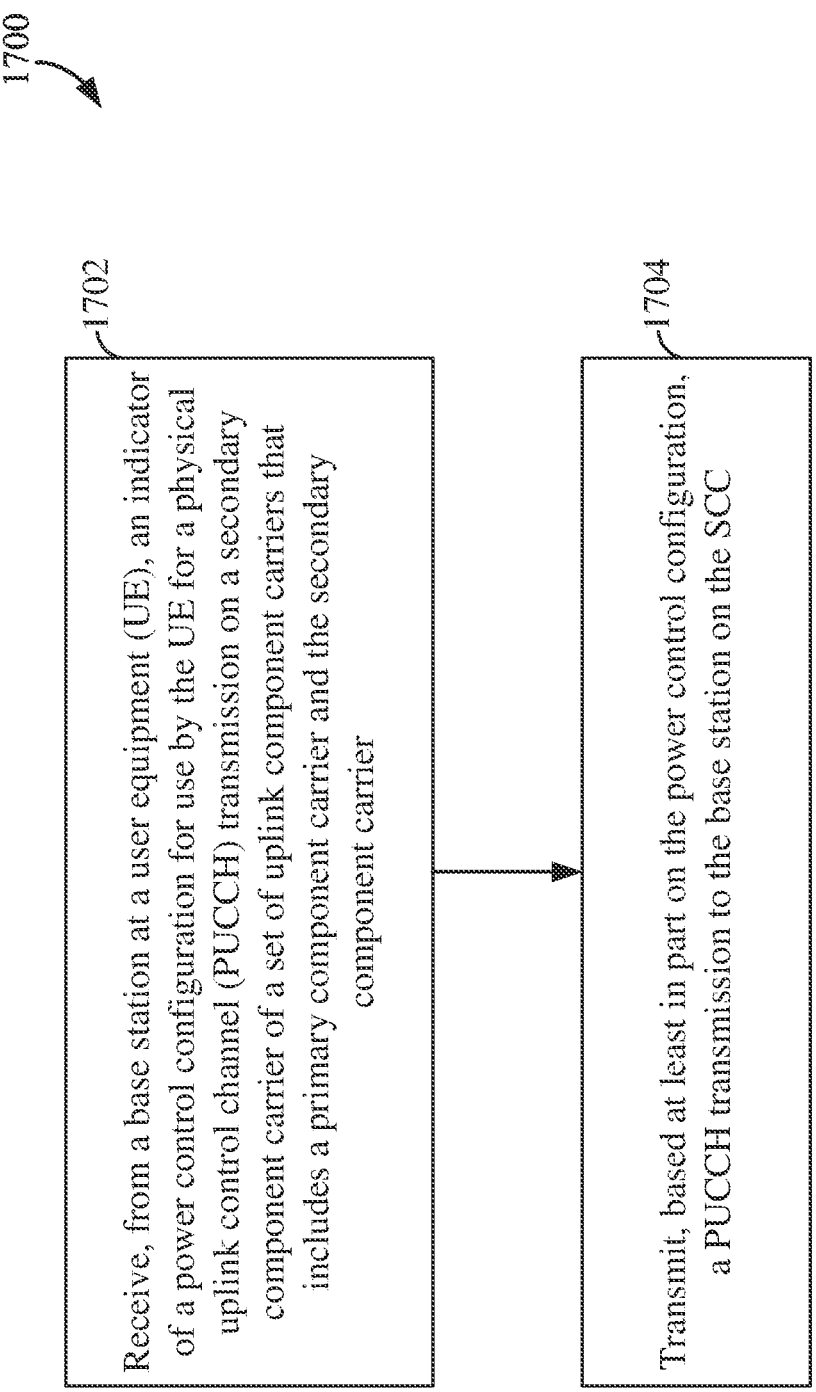
FIG. 17 is a flow chart illustrating an exemplary process for use by a UE (or other scheduled entity) according to some aspects.

FIG. 17 is a flow chart illustrating an exemplary process 1700 according to some aspects. As described below, some or all illustrated features may be omitted in a particular implementation within the scope of the present disclosure, and some illustrated features may not be required for implementation of all examples. In some examples, the process 1700 may be carried out by the UE (e.g., the UE 1600 illustrated in FIG. 16). In some examples, the process 1700 may be carried out by any suitable apparatus or means for carrying out the functions or algorithm described below.

At block 1702, a UE receives, from a base station, an indicator of a power control configuration for use by the UE for a PUCCH transmission on a secondary component carrier of a set of uplink component carriers that includes a primary component carrier and the secondary component carrier. For example, either the uplink SCC open-loop power control circuit 1640 or the uplink SCC closed-loop power control circuit 1642 (or both) shown and described above in connection with FIG. 16 may provide means for receiving, from a base station, an indicator of a power control configuration for use by the UE for a PUCCH transmission on a secondary component carrier of a set of uplink component carriers that includes a primary component carrier and the secondary component carrier.

At block 1704, the UE transmits, based at least in part on the power control configuration, a PUCCH transmission to the base station on the SCC. For example, the uplink SCC PUCCH transmission circuit 1644 shown and described above in connection with FIG. 16 may provide a means for transmitting, based at least in part on the power control configuration, a PUCCH transmission to the base station on the SCC.

Figure 18:
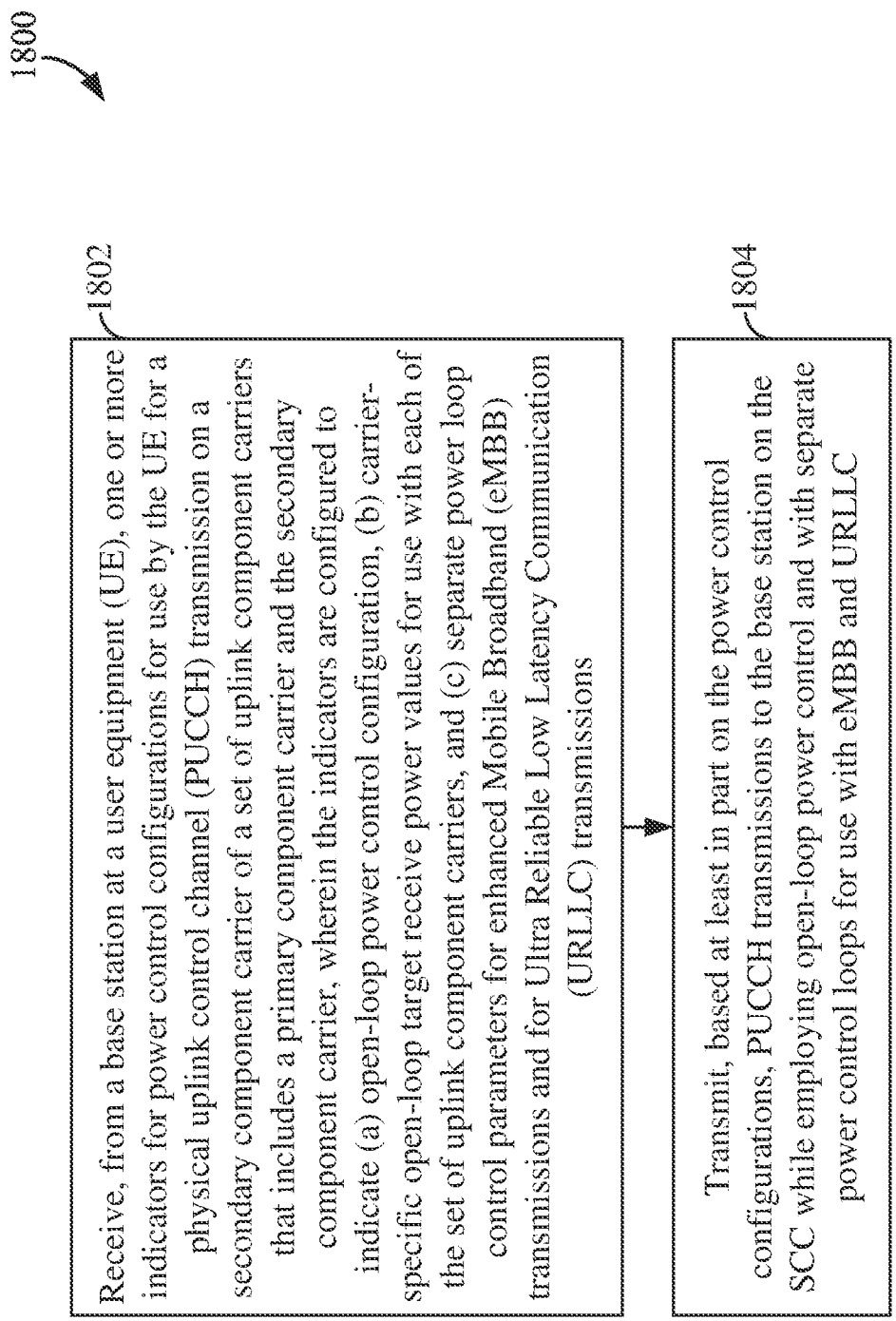
FIG. 18 is a flow chart illustrating further aspects of an exemplary process for use by a UE (or other scheduled entity) for open-loop power control according to some aspects.

FIG. 18 is a flow chart illustrating an exemplary process 1800 according to some aspects. Some or all illustrated features may be omitted in a particular implementation within the scope of the present disclosure, and some illustrated features may not be required for implementation of all examples. In some examples, the process 1800 may be carried out by the UE (e.g., the UE 1600 illustrated in FIG. 16. In some examples, the process 1800 may be carried out by any suitable apparatus or means for carrying out the functions or algorithm described below.

At block 1802, a UE receives, from a base station (e.g., the base station 1500 illustrated in FIG. 15), one or more indicators for power control configurations for use by the UE for a PUCCH transmission on a secondary component carrier of a set of uplink component carriers that includes a primary component carrier and the secondary component carrier, wherein the indicators are configured to indicate (a) open-loop power control configuration, (b) carrier-specific open-loop target receive power values for use with each of the set of uplink component carriers, and (c) separate power loop control parameters for eMBB transmissions and for URLLC transmissions. At block 1804, the UE transmits, based at least in part on the power control configurations, PUCCH transmissions to the base station on the SCC while employing open-loop power control and with separate power control loops for use with eMBB and URLLC.

Figure 19:
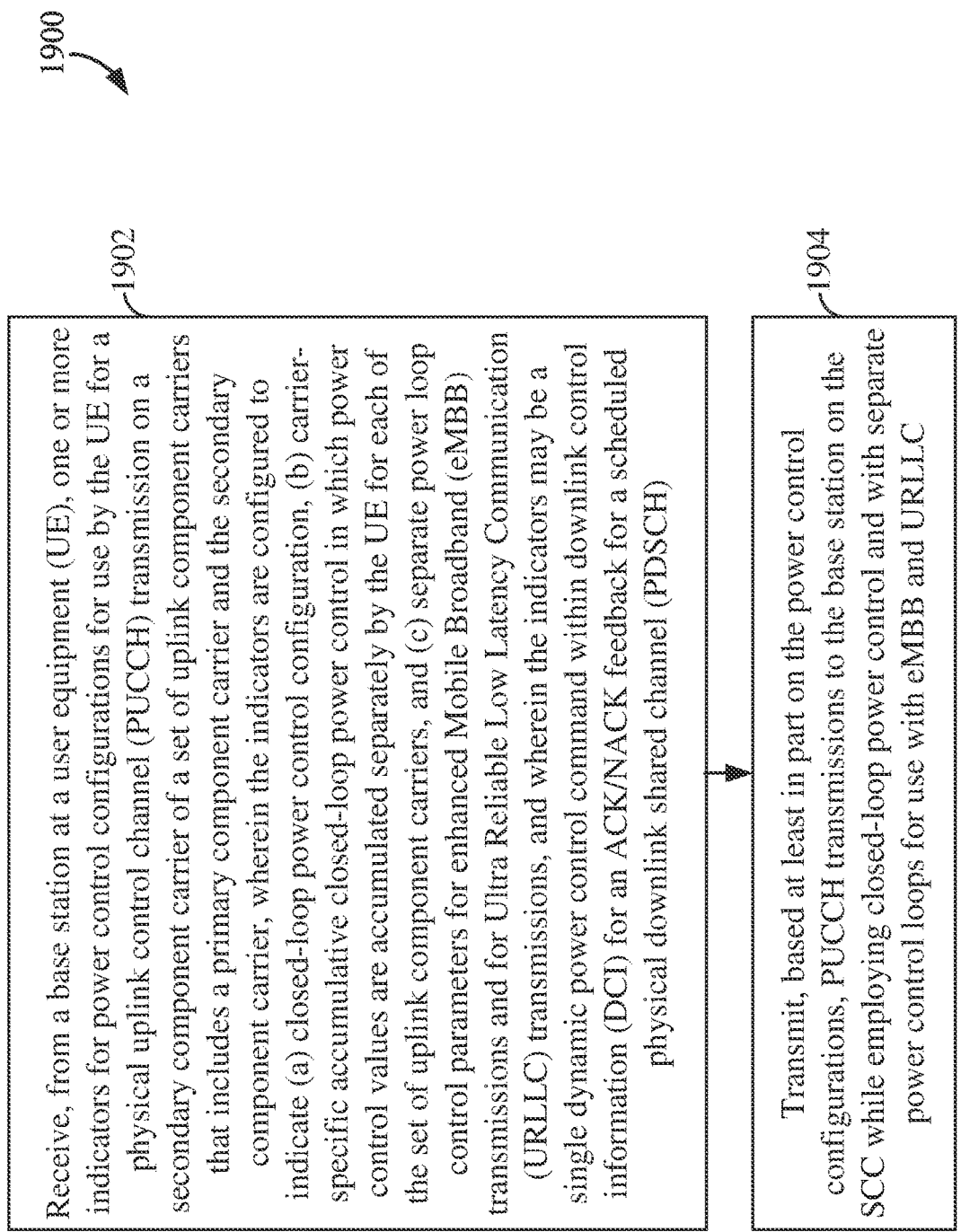
FIG. 19 is a flow chart illustrating further aspects of an exemplary process for use by a UE (or other scheduled entity) for closed-loop power control according to some aspects.

FIG. 19 is a flow chart illustrating an exemplary process 1900 according to some aspects. Some or all illustrated features may be omitted in a particular implementation within the scope of the present disclosure, and some illustrated features may not be required for implementation of all examples. In some examples, the process 1900 may be carried out by the UE (e.g., the UE 1600 illustrated in FIG. 16). In some examples, the process 1900 may be carried out by any suitable apparatus or means for carrying out the functions or algorithm described below.

At block 1902, a UE receives, from a base station (e.g., the base station 1500 illustrated in FIG. 15), one or more indicators for power control configurations for use by the UE for a PUCCH transmission on a secondary component carrier of a set of uplink component carriers that includes a primary component carrier and the secondary component carrier, wherein the indicators are configured to indicate (a) closed-loop power control configuration, (b) carrier-specific accumulative closed-loop power control in which power control values are accumulated separately by the UE for each of the set of uplink component carriers, and (c) separate power loop control parameters for eMBB transmissions and for URLLC transmissions, and wherein the indicators may be a single dynamic power control command within DCI for an ACK/NACK feedback for a scheduled PDSCH. At block 1904, the UE transmits, based at least in part on the power control configurations, PUCCH transmissions to the base station on the SCC while employing closed-loop power control and with separate power control loops for use with eMBB and URLLC.

Figure 20:
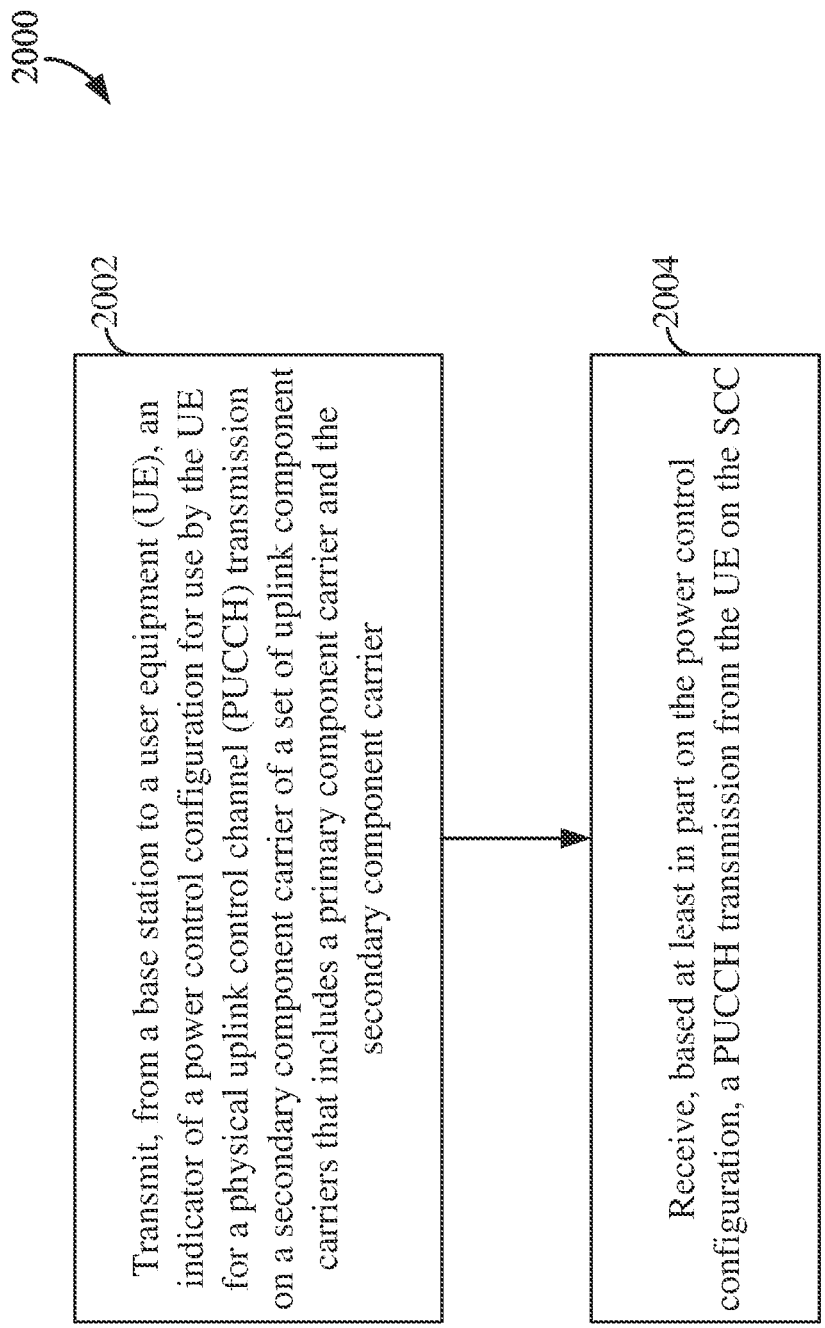
FIG. 20 is a flow chart illustrating an exemplary process for use by a base station (or other scheduling entity) according to some aspects.

FIG. 20 is a flow chart illustrating an exemplary process 2000 according to some aspects. Some or all illustrated features may be omitted in a particular implementation within the scope of the present disclosure, and some illustrated features may not be required for implementation of all examples. In some examples, the process 2000 may be carried out by the base station (e.g., the base station 1500 illustrated in FIG. 15). In some examples, the process 2000 may be carried out by any suitable apparatus or means for carrying out the functions or algorithm described below.

At block 2002, a base station (e.g., a scheduling entity) transmits, to a UE (or other scheduled entity), an indicator of a power control configuration for use by the UE for a PUCCH transmission on a secondary component carrier of a set of uplink component carriers that includes a primary component carrier and the secondary component carrier. For example, either the uplink SCC open-loop power control configuration circuit 1540 or the uplink SCC closed-loop power control configuration circuit 1542 (or both) shown and described above in connection with FIG. 15 may provide means for transmitting, to a UE, an indicator of a power control configuration for use by the UE for a PUCCH transmission on a secondary component carrier of a set of uplink component carriers that comprises a primary component carrier and the secondary component carrier.

At block 2004, the base station receives, based at least in part on the power control configuration, a PUCCH transmission from the UE on the SCC. For example, the uplink SCC PUCCH reception circuit 1544 shown and described above in connection with FIG. 15 may provide means for receiving, based at least in part on the power control configuration, the PUCCH transmission from the UE on the secondary component carrier.

FIG. 21 is a flow chart illustrating an exemplary process 2100 according to some aspects. Some or all illustrated features may be omitted in a particular implementation within the scope of the present disclosure, and some illustrated features may not be required for implementation of all examples. In some examples, the process 2100 may be carried out by the base station (e.g., the base station 1500 illustrated in FIG. 15). In some examples, the process 2100 may be carried out by any suitable apparatus or means for carrying out the functions or algorithm described below.

At block 2102, a base station (e.g., the base station 1500 illustrated in FIG. 15) transmits to a UE (e.g., the UE 1600 illustrated in FIG. 16) one or more indicators for power control configurations for use by the UE for a PUCCH transmission on a secondary component carrier of a set of uplink component carriers that includes a primary component carrier and the secondary component carrier, wherein the indicators are configured to indicate (a) open-loop power control configuration, (b) carrier-specific accumulative open-loop power control for use with each of the set of uplink component carriers, and (c) separate power loop control parameters for eMBB transmissions and for URLLC transmissions, and wherein the indicators may be a single dynamic power control command within DCI for an ACK/NACK feedback for a scheduled PDSCH. At block 2104, the base station receives, based at least in part on the power control configurations, PUCCH transmissions from the UE on the SCC while employing open-loop power control and with separate power control loops for use with eMBB and URLLC.

Figure 22:
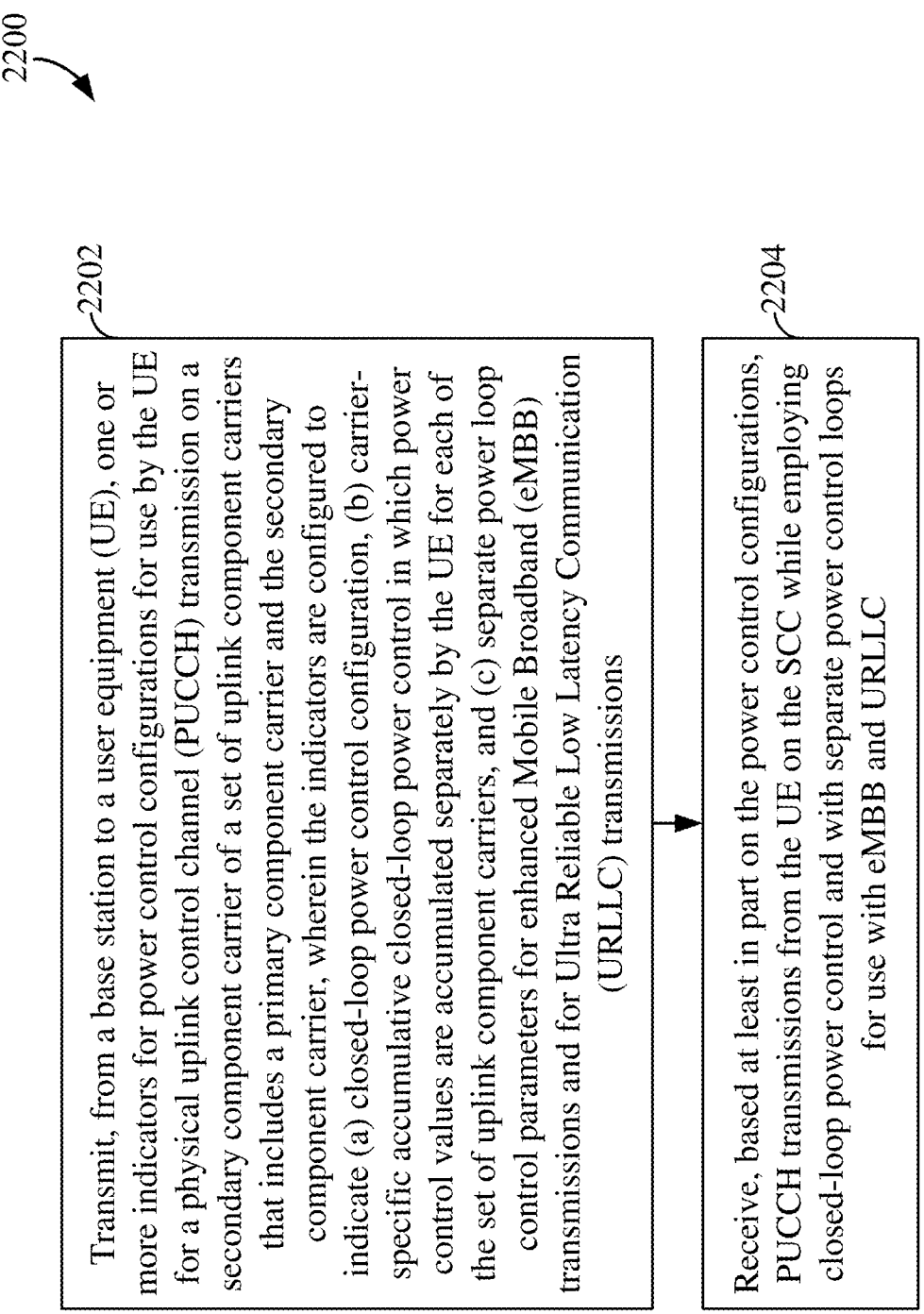
FIG. 22 is a flow chart illustrating further aspects of an exemplary process for use by a base station (or other scheduling entity) for closed-loop power control according to some aspects.

FIG. 22 is a flow chart illustrating an exemplary process 2200 according to some aspects. Some or all illustrated features may be omitted in a particular implementation within the scope of the present disclosure, and some illustrated features may not be required for implementation of all examples. In some examples, the process 2200 may be carried out by the base station (e.g., the base station 1500 illustrated in FIG. 15). In some examples, the process 2200 may be carried out by any suitable apparatus or means for carrying out the functions or algorithm described below.

At block 2202, a base station (e.g., the base station 1500 illustrated in FIG. 15) transmits to a UE (e.g., the UE 1600 illustrated in FIG. 16) one or more indicators for power control configurations for use by the UE for a PUCCH transmission on a secondary component carrier of a set of uplink component carriers that includes a primary component carrier and the secondary component carrier, wherein the indicators are configured to indicate (a) closed-loop power control configuration, (b) carrier-specific accumulative closed-loop power control in which power control values are accumulated separately by the UE for each of the set of uplink component carriers, and (c) separate power loop control parameters for eMBB transmissions and for URLLC transmissions, and wherein the indicators may be a single dynamic power control command within DCI for an ACK/NACK feedback for a scheduled PDSCH. At block 2204, the base station receives, based at least in part on the power control configurations, PUCCH transmissions from the UE on the SCC while employing closed-loop power control and with separate power control loops for use with eMBB and URLLC.

The following provides an overview of examples of the present disclosure.

> Example 1: a UE, comprising: a transceiver; a memory; and a processor communicatively coupled to the transceiver and the memory and configured to: receive, from a base station, an indicator of a power control configuration for use by the UE for a PUCCH transmission on a secondary component carrier of a set of uplink component carriers that comprises a primary component carrier and the secondary component carrier; and transmit, based at least in part on the power control configuration, the PUCCH transmission to the base station on the secondary component carrier.
>
> Example 2: the UE of example 1, wherein the indicator is configured to indicate an open-loop power control configuration.
>
> Example 3: the UE of example 2, wherein the indicator is further configured to indicate carrier-specific open-loop target receive power values for use with each of the set of uplink component carriers.
>
> Example 4: the UE of example 1, wherein the indicator is further configured to indicate a closed-loop power control command.
>
> Example 5: the UE of example 4, wherein the indicator is further configured to indicate carrier-specific accumulative closed-loop power control in which power control values are accumulated separately by the UE for each of the set of uplink component carriers.

Example 6: the UE of example 5, wherein the processor is further configured to receive, from the base station, separate power adjustment indicator signals for each of the set of uplink component carriers in accordance with the carrier-specific accumulative closed-loop power control.

Example 7: the UE of examples 4, 5, or 6, wherein the indicator comprises a single dynamic power control command within DCI for an ACK/NACK feedback for a scheduled PDSCH.

Example 8: the UE of examples 1, 2, 3, 4, 5, 6, or 7, wherein the indicator comprises a first indicator for use with an eMBB transmission and a second indicator for use with a URLLC transmission.

Example 9: a method for wireless communication at a UE, the method comprising: receiving, from a base station, an indicator of a power control configuration for use by the UE for a PUCCH transmission on a secondary component carrier of a set of uplink component carriers that comprises a primary component carrier and the secondary component carrier; and transmitting, based at least in part on the power control configuration, the PUCCH transmission to the base station on the secondary component carrier.

Example 10: the method of example 9, wherein the indicator is configured to indicate an open-loop power control configuration.

Example 11: the method of example 10, wherein the indicator is further configured to indicate carrier-specific open-loop target receive power values for use with each of the set of uplink component carriers.

Example 12: the method of example 9, wherein the indicator is further configured to indicate a closed-loop power control command.

Example 13: the method of example 12, wherein the indicator is further configured to indicate carrier-specific accumulative closed-loop power control in which power control values are accumulated separately by the UE for each of the set of uplink component carriers.

Example 14: the method of examples 12 or 13, wherein the indicator comprises a single dynamic power control command within DCI for an ACK/NACK feedback for a scheduled PDSCH.

Example 15: the method of example 9, 10, 11, 12, 13, or 14, wherein the indicator comprises a first indicator for use with an eMBB transmission and a second indicator for use with a URLLC transmission.

Example 16: a base station, comprising: a transceiver; a memory; and a processor communicatively coupled to the transceiver and the memory and configured to: transmit, to a UE, an indicator of a power control configuration for use by the UE for a PUCCH transmission on a secondary component carrier of a set of uplink component carriers that comprises a primary component carrier and the secondary component carrier; and receive, based at least in part on the power control configuration, the PUCCH transmission from the UE on the secondary component carrier.

Example 17: the base station of example 16, wherein the indicator is configured to indicate an open-loop power control configuration.

Example 18: the base station of example 17, wherein the indicator is further configured to indicate carrier-specific open-loop target receive power values for use with each of the set of uplink component carriers.

Example 19: the base station of example 16, wherein the indicator is further configured to indicate a closed-loop power control command.

Example 20: the base station of example 19, wherein the indicator is further configured to indicate carrier-specific accumulative closed-loop power control in which power control values are accumulated separately by the UE for each of the set of uplink component carriers.

Example 21: the base station of example 20, wherein the processor is further configured to transmit, to the UE, separate power adjustment indicator signals for each of the set of uplink component carriers in accordance with the carrier-specific accumulative closed-loop power control.

Example 22: the base station of examples 19, 20, or 21, wherein the indicator comprises a single dynamic power control command within DCI for an ACK/NACK feedback for a scheduled PDSCH.

Example 23: the base station of examples 16, 17, 18, 19, 20, 21, or 22, wherein the indicator comprises a first indicator for use with an eMBB transmission and a second indicator for use with a URLLC transmission.

Example 24: a method for wireless communication at a base station, the method comprising: transmitting, to a UE, an indicator of a power control configuration for use by the UE for a PUCCH transmission on a secondary component carrier of a set of uplink component carriers that comprises a primary component carrier and the secondary component carrier; and receiving, based at least in part on the power control configuration, the PUCCH transmission from the UE on the secondary component carrier.

Example 25: the method of example 24, wherein the indicator is configured to indicate an open-loop power control configuration.

Example 26: the method of example 25, wherein the indicator is further configured to indicate carrier-specific open-loop target receive power values for use with each of the set of uplink component carriers.

Example 27: the method of example 24, wherein the indicator is further configured to indicate a closed-loop power control command.

Example 28: the method of example 27, wherein the indicator is further configured to indicate carrier-specific accumulative closed-loop power control in which power control values are accumulated separately by the UE for each of the set of uplink component carriers.

Example 29: the method of examples 24, 25, 26, or 27, wherein the indicator comprises a single dynamic power control command within DCI for an ACK/NACK feedback for a scheduled PDSCH.

Example 30: the method of examples 24, 25, 26, 27, or 28, wherein the indicator comprises a first indicator for use with an eMBB transmission and a second indicator for use with an URLLC transmission.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 1002.11 (Wi-Fi), IEEE 1002.16 (WiMAX), IEEE 1002.20, Ultra-Wideband (UWB), Bluetooth, and/or other suitable systems. The actual telecommunication standard, network architecture, and/or communication standard employed will depend on the specific application and the overall design constraints imposed on the system.

While aspects and embodiments are described in this application by illustration to some examples, those skilled in the art will understand that additional implementations and use cases may come about in many different arrangements and scenarios. Features described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range across a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that features described herein may be practiced in a wide variety of devices, chip-level components, systems, distributed arrangements, end-user devices, etc. of varying sizes, shapes and constitution.

Within the present disclosure, the word "exemplary" is used to mean "serving as an example, instance, or illustration." Any implementation or aspect described herein as "exemplary" is not necessarily to be construed as preferred or advantageous over other aspects. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 6, 9, 15, and 16 may be configured to perform one or more of the methods, features, or steps described herein. The novel algorithms described herein may also be efficiently implemented in software and/or embedded in hardware. Generally speaking, the various components, steps, features and/or functions illustrated in FIGS. 1-22 are not mutually exclusive.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE), comprising:
 a transceiver;
 a memory; and
 a processor communicatively coupled to the transceiver and the memory and configured to:
  receive, from a base station, an indicator of an open-loop power control configuration for use by the UE for a physical uplink control channel (PUCCH) transmission on a secondary component carrier of a set of uplink component carriers that comprises a primary component carrier and the secondary component carrier, wherein the indicator is configured to indicate carrier-specific open loop target receive power values for the primary component carrier and for the secondary component carrier, and wherein the indicator is further configured to indicate carrier-specific spatial relationship information, the spatial relationship information comprising a closed-loop index; and transmit, based at least in part on the power control configuration, the PUCCH transmission to the base station on the secondary component carrier.

2. The UE of claim 1, wherein the carrier-specific spatial relationship information further comprises a path loss reference value.

3. The UE of claim 1, wherein the carrier-specific spatial relationship information further comprises a PUCCH identifier (ID).

4. The UE of claim 1, wherein the UE supports a plurality of secondary component carriers, and wherein the indicator is further configured to indicate the carrier-specific spatial relationship information for the primary component carrier and for each of the plurality of secondary component carriers.

5. The UE of claim 1, wherein the UE supports a plurality of secondary component carriers, and wherein the indicator is further configured to indicate the carrier-specific open loop target receive power values for the primary component carrier and for each of the plurality of secondary component carriers.

6. The UE of claim 1, wherein the indicator is further configured to indicate a nominal PUCCH power value and a power set value.

7. A method for wireless communication at a user equipment (UE), the method comprising:

receiving, from a base station, an indicator of an open-loop power control configuration for use by the UE for a physical uplink control channel (PUCCH) transmission on a secondary component carrier of a set of uplink component carriers that comprises a primary component carrier and the secondary component carrier, wherein the indicator is configured to indicate carrier-specific open loop target receive power values for the primary component carrier and for the secondary component carrier, and wherein the indicator is further configured to indicate carrier-specific spatial relationship information, the spatial relationship information comprising a closed-loop index; and transmitting, based at least in part on the power control configuration, the PUCCH transmission to the base station on the secondary component carrier.

8. The method of claim 7, wherein the carrier-specific spatial relationship information further comprises a path loss reference value.

9. The method of claim 7, wherein the carrier-specific spatial relationship information further comprises a PUCCH identifier (ID).

10. The method of claim 7, wherein the UE supports a plurality of secondary component carriers, and wherein the indicator is further configured to indicate the carrier-specific spatial relationship information for the primary component carrier and for each of the plurality of secondary component carriers.

11. The method of claim 7, wherein the UE supports a plurality of secondary component carriers, and wherein the indicator is further configured to indicate the carrier-specific open loop target receive power values for the primary component carrier and for each of the plurality of secondary component carriers.

12. The method of claim 7, wherein the indicator is further configured to indicate a nominal PUCCH power value and a power set value.

13. A base station, comprising:
a transceiver;
a memory; and
a processor communicatively coupled to the transceiver and the memory and configured to:

transmit, to a user equipment (UE), an indicator of an open-loop power control configuration for use by the UE for a physical uplink control channel (PUCCH) transmission on a secondary component carrier of a set of uplink component carriers that comprises a primary component carrier and the secondary component carrier, wherein the indicator is configured to indicate carrier-specific open loop target receive power values for the primary component carrier and for the secondary component carrier, and wherein the indicator is further configured to indicate carrier-specific spatial relationship information, the spatial relationship information comprising a closed-loop index; and receive, based at least in part on the power control configuration, the PUCCH transmission from the UE on the secondary component carrier.

14. The base station of claim 13, wherein the carrier-specific spatial relationship information further comprises a path loss reference value.

15. The base station of claim 13, wherein the carrier-specific spatial relationship information further comprises a PUCCH identifier (ID).

16. The base station of claim 13, wherein the UE supports a plurality of secondary component carriers, and wherein the indicator is further configured to indicate the carrier-specific spatial relationship information for the primary component carrier and for each of the plurality of secondary component carriers.

17. The base station of claim 13, wherein the UE supports a plurality of secondary component carriers, and wherein the indicator is further configured to indicate the carrier-specific open loop target receive power values for the primary component carrier and for each of the plurality of secondary component carriers.

18. A method for wireless communication at a base station, the method comprising:

transmitting, to a user equipment (UE), an indicator of an open-loop power control configuration for use by the UE for a physical uplink control channel (PUCCH) transmission on a secondary component carrier of a set of uplink component carriers that comprises a primary component carrier and the secondary component carrier, wherein the indicator is configured to indicate carrier-specific open loop target receive power values for the primary component carrier and for the secondary component carrier, and wherein the indicator is further configured to indicate carrier-specific spatial relationship information, the spatial relationship information comprising a closed-loop index; and receiving, based at least in part on the power control configuration, the PUCCH transmission from the UE on the secondary component carrier.

19. The method of claim 18, wherein the carrier-specific spatial relationship information further comprises a path loss reference value.

20. The method of claim 18, wherein the carrier-specific spatial relationship information further comprises a PUCCH identifier (ID).

21. The method of claim 18, wherein the UE supports a plurality of secondary component carriers, and wherein the indicator is further configured to indicate the carrier-specific spatial relationship information for the primary component carrier and for each of the plurality of secondary component carriers.

22. The method of claim 18, wherein the UE supports a plurality of secondary component carriers, and wherein the indicator is further configured to indicate the carrier-specific open loop target receive power values for the primary component carrier and for each of the plurality of secondary component carriers.

23. The method of claim 18, wherein the indicator is further configured to indicate a nominal PUCCH power value and a power set value.

* * * * *